(12) United States Patent
Krone et al.

(10) Patent No.: US 10,849,304 B2
(45) Date of Patent: *Dec. 1, 2020

(54) SPACE DIVIDER OF A MILKING PARLOR ARRANGEMENT, AND MILKING PARLOR ARRANGEMENT

(71) Applicant: GEA Farm Technologies GmbH, Bönen (DE)

(72) Inventors: Otto Krone, Ibbenbüren (DE); Derk Hensel, Jessen (DE); Thomas Mader, Rheda-Wiedenbrück (DE); Armin Hönscheid, Bönen (DE); Dieter Hille, Oelde (DE); Erich Schneider, Ahlen (DE); Marc Trossehl, Werne (DE)

(73) Assignee: GEA Farm Technologies GmbH, Bönen (DE)

( * ) Notice: Subject to any disclaimer, the term of this patent is extended or adjusted under 35 U.S.C. 154(b) by 742 days.

This patent is subject to a terminal disclaimer.

(21) Appl. No.: 14/384,668

(22) PCT Filed: Mar. 14, 2013

(86) PCT No.: PCT/EP2013/055270
§ 371 (c)(1),
(2) Date: Sep. 11, 2014

(87) PCT Pub. No.: WO2013/135832
PCT Pub. Date: Sep. 19, 2013

(65) Prior Publication Data
US 2015/0189854 A1    Jul. 9, 2015

(30) Foreign Application Priority Data

Mar. 14, 2012  (DE) .................. 10 2012 102 132
Nov. 2, 2012   (DE) .................. 10 2012 110 501

(51) Int. Cl.
*A01J 5/00*   (2006.01)
*A01J 5/04*   (2006.01)
(Continued)

(52) U.S. Cl.
CPC ............... *A01J 5/041* (2013.01); *A01J 5/003* (2013.01); *A01J 5/007* (2013.01); *A01J 5/017* (2013.01);
(Continued)

(58) Field of Classification Search
CPC .......... A01K 1/12; A01K 1/123; A01K 1/126; A01J 5/00; A01J 5/007; A01J 5/0175; A01J 7/025
See application file for complete search history.

(56) References Cited

U.S. PATENT DOCUMENTS 1,525,837 A    2/1925   Walker et al.
2,357,373 A    9/1944   Anderson
(Continued)

FOREIGN PATENT DOCUMENTS

DE    3931769        4/1991
DE    4101530 A1     7/1992
(Continued)

OTHER PUBLICATIONS

International Search Report in Corresponding PCT Application No. PCT/EP2013/055270 dated Mar. 14, 2013.
(Continued)

*Primary Examiner* — Monica L Barlow
*Assistant Examiner* — Michael A. Fabula
(74) *Attorney, Agent, or Firm* — Smith Law Office; Jeffry W. Smith

(57) ABSTRACT

A space divider (4) of a milking parlor arrangement (1, 1', 1", 1'") for at least one milking parlor (3) for milking milk-producing animals (T), wherein the space divider (4) is
(Continued)

arranged approximately parallel to a longitudinal axis of the animal (T) to be milked, has an arm device (6) having a milking cluster (5), which can be adjusted from a parking position to a working position and back. The arm device (6) is arranged with the milking cluster (5) in the parking position in the space divider (4) and can be adjusted into the working position laterally to the animal (T) to be milked between the front and rear legs thereof in fully automatic operation or semi-automatic operation. The space divider (4) is designed in such a way that no additional space is required between adjacent animals (T), so that many animals (T) can be milked in a milking parlor arrangement (1, 1', 1", 1'") while the smallest possible amount of space is required.

21 Claims, 25 Drawing Sheets

(51) Int. Cl.
A01J 5/003 (2006.01)
A01K 1/12 (2006.01)
A01J 5/017 (2006.01)
A01J 7/02 (2006.01)
A01J 5/007 (2006.01)

(52) U.S. Cl.
CPC ............ A01J 5/0175 (2013.01); A01J 7/02 (2013.01); A01J 7/025 (2013.01); A01K 1/12 (2013.01); A01K 1/123 (2013.01); A01K 1/126 (2013.01)

(56) References Cited

U.S. PATENT DOCUMENTS

| | | | |
|---|---|---|---|
| 3,100,475 A | 8/1963 | Edge | |
| 3,448,725 A | 6/1969 | Holm et al. | |
| 3,861,355 A | 1/1975 | Johnson et al. | |
| 3,870,021 A | 3/1975 | Nederbragt | |
| 4,171,684 A | 10/1979 | Herr et al. | |
| 1,401,055 A | 8/1983 | Street et al. | |
| 4,459,940 A | 6/1984 | Noorlander | |
| 4,479,453 A | 10/1984 | Bonassi | |
| 4,508,058 A | 4/1985 | Jakobson et al. | |
| 4,838,207 A * | 6/1989 | Bom .................. | A01J 5/0175 119/14.02 |
| 4,854,268 A | 8/1989 | Kipe | |
| 4,941,433 A | 7/1990 | Hanauer | |
| 5,042,428 A | 8/1991 | Van Der Lely et al. | |
| 5,056,466 A | 10/1991 | Dessing et al. | |
| 5,383,423 A | 1/1995 | Van Der Lely | |
| 5,524,572 A | 6/1996 | Dessing et al. | |
| 5,586,518 A | 12/1996 | Carrano | |
| 5,595,945 A | 1/1997 | Wicks | |
| 5,596,945 A * | 1/1997 | van der Lely ........ | A01J 5/0175 119/14.03 |
| 5,606,932 A * | 3/1997 | van der Lely .......... | A01J 5/007 119/14.14 |
| 5,678,506 A | 10/1997 | Van Der Berg et al. | |
| 5,697,324 A * | 12/1997 | van der Lely .......... | A01J 5/007 119/14.08 |
| 5,718,185 A | 2/1998 | Pichler et al. | |
| 5,718,186 A | 2/1998 | Van Der Lely | |
| 5,784,994 A * | 7/1998 | van der Lely ........ | A01J 5/0175 119/14.08 |
| 5,826,536 A * | 10/1998 | van der Lely ........ | A01J 5/0175 119/14.02 |
| 5,862,776 A * | 1/1999 | van den Berg ....... | A01J 5/0175 119/14.1 |
| 5,918,566 A * | 7/1999 | van den Berg .......... | A01J 7/04 119/14.02 |
| 5,950,561 A * | 9/1999 | Redmond ............... | A01J 5/017 119/14.23 |
| 5,979,359 A | 11/1999 | Hansson | |
| 6,044,793 A | 4/2000 | Van Der Lely | |
| 6,050,219 A * | 4/2000 | van der Lely ........ | A01J 5/0175 119/14.04 |
| 6,116,188 A | 9/2000 | Van Der Lely | |
| 6,148,766 A | 11/2000 | Van Der Lely | |
| 6,205,949 B1 | 3/2001 | Van Den Berg | |
| 6,213,051 B1* | 4/2001 | Fransen ............... | A01J 5/0175 119/14.01 |
| 6,244,215 B1* | 6/2001 | Oosterling ........... | A01J 5/0175 119/14.02 |
| 6,279,507 B1* | 8/2001 | van der Lely ........ | A01J 5/0175 119/14.01 |
| 6,336,424 B1 | 1/2002 | Kullberg et al. | |
| 6,357,387 B1 | 3/2002 | Johannesson | |
| 6,363,883 B1 | 4/2002 | Birk | |
| 6,382,130 B1 | 5/2002 | Rooney | |
| 6,386,141 B1* | 5/2002 | Forsen ................. | A01J 5/0175 119/14.08 |
| 6,450,118 B1 | 9/2002 | Eppers, Jr. | |
| 6,532,893 B1 | 3/2003 | Edholm | |
| 6,584,929 B2* | 7/2003 | van der Lely ........ | A01J 5/0175 119/14.01 |
| 6,814,027 B2 | 11/2004 | Hein et al. | |
| 6,814,224 B2 | 11/2004 | Garbagnati | |
| 6,843,203 B2 | 1/2005 | Johannesson et al. | |
| 7,104,218 B2 | 9/2006 | Teckentrup et al. | |
| 7,131,394 B2 | 11/2006 | Johannesson et al. | |
| 7,246,571 B2 | 7/2007 | Van Den Berg et al. | |
| 7,699,024 B2 | 4/2010 | Rysewyk et al. | |
| 7,762,405 B2 | 7/2010 | Vogel et al. | |
| 7,874,263 B2 | 1/2011 | Schulte | |
| 8,015,941 B2* | 9/2011 | Hallstrom ............... | A01K 1/12 119/14.02 |
| 8,205,574 B2 | 6/2012 | Danneker et al. | |
| 8,210,122 B2 | 7/2012 | Pettersson et al. | |
| 8,281,744 B2* | 10/2012 | Van Den Berg ........ | A01J 5/003 119/14.08 |
| 8,281,746 B2 | 10/2012 | Nilsson et al. | |
| 8,286,583 B2 | 10/2012 | Van Den Berg | |
| 8,438,992 B2 | 5/2013 | Auburger | |
| 8,601,979 B2 | 12/2013 | Van Der Sluis | |
| 8,646,412 B2 | 2/2014 | Eriksson | |
| 8,670,867 B2 | 3/2014 | Seaton et al. | |
| 8,704,396 B2 | 4/2014 | Leijon et al. | |
| 9,107,378 B2 | 8/2015 | Hofman et al. | |
| 9,161,512 B2 | 10/2015 | Hofman et al. | |
| 9,215,858 B2 | 12/2015 | Johannesson et al. | |
| 9,215,861 B2 | 12/2015 | Hofman et al. | |
| 9,402,364 B2 | 8/2016 | Seaton et al. | |
| 9,426,966 B2 | 8/2016 | Krone | |
| 9,491,924 B2 | 11/2016 | Hofman et al. | |
| 9,549,530 B2* | 1/2017 | Harty, Sr. ............. | A01J 5/0175 |
| 9,681,634 B2 | 6/2017 | Hofman et al. | |
| 9,730,424 B2 | 8/2017 | Krone et al. | |
| 9,848,576 B2 | 12/2017 | Krone et al. | |
| 9,918,450 B2 | 3/2018 | Krone et al. | |
| 10,154,645 B2 | 12/2018 | Foresman et al. | |
| 10,440,931 B2 | 10/2019 | Krone | |
| 2001/0028021 A1 | 10/2001 | Martin | |
| 2004/0168645 A1 | 9/2004 | Deelstra | |
| 2005/0066904 A1* | 3/2005 | Berg .................... | A01J 5/0175 119/14.08 |
| 2005/0072363 A1* | 4/2005 | Van der Lingen ....... | A01J 5/017 119/14.13 |
| 2007/0277737 A1* | 12/2007 | Maier .................... | A01J 5/007 119/14.45 |
| 2008/0149034 A1* | 6/2008 | Van Den Berg ........ | A01J 5/003 119/14.08 |
| 2008/0178811 A1 | 7/2008 | Heinrich | |
| 2009/0007850 A1* | 1/2009 | Mehinovic .............. | A01J 5/041 119/14.54 |
| 2010/0058990 A1 | 3/2010 | Danneker et al. | |
| 2010/0186676 A1* | 7/2010 | Van Der Berg ........ | A01J 5/003 119/14.08 |
| 2010/0326361 A1* | 12/2010 | Van Den Berg ........ | A01J 5/017 119/14.47 |

(56) References Cited

U.S. PATENT DOCUMENTS

| | | | |
|---|---|---|---|
| 2011/0061596 A1* | 3/2011 | Nilsson | A01J 5/0175 119/14.08 |
| 2011/0114024 A1 | 5/2011 | Van Den Berg | |
| 2012/0055408 A1 | 3/2012 | Van Der Sluis et al. | |
| 2013/0061807 A1 | 3/2013 | Axelsson | |
| 2013/0112145 A1 | 5/2013 | Carroll et al. | |
| 2014/0041591 A1* | 2/2014 | Krone | A01J 5/0175 119/14.02 |
| 2014/0060436 A1* | 3/2014 | Krone | A01J 5/017 119/14.1 |
| 2015/0020738 A1* | 1/2015 | Krone | A01J 5/0175 119/14.04 |
| 2015/0020739 A1* | 1/2015 | Krone | A01K 1/126 119/14.04 |
| 2015/0059649 A1 | 3/2015 | Van Der Sluis et al. | |
| 2015/0296737 A1 | 10/2015 | Krone et al. | |
| 2017/0042110 A1 | 2/2017 | Krone et al. | |
| 2017/0086419 A1* | 3/2017 | Krone | A01J 5/0175 |
| 2018/0020632 A1 | 1/2018 | Krone et al. | |
| 2018/0249670 A1 | 9/2018 | Krone | |

FOREIGN PATENT DOCUMENTS

| | | |
|---|---|---|
| DE | 4113700 A1 | 10/1992 |
| DE | 4237949 A1 | 5/1994 |
| DE | 4339131 A1 | 5/1995 |
| DE | 29522237 | 1/2001 |
| DE | 102006027919 | 12/2006 |
| DE | 102006049948 A1 | 4/2007 |
| DE | 102008063751 A1 | 7/2009 |
| DE | 202012005042 U1 | 10/2013 |
| DE | 60106877 T3 | 6/2014 |
| EP | 0576085 A2 | 12/1993 |
| EP | 0647390 | 4/1995 |
| EP | 0647391 A2 | 4/1995 |
| EP | 0657097 | 9/1995 |
| EP | 0689762 A1 | 1/1996 |
| EP | 0734649 | 3/1997 |
| EP | 0811319 | 12/1997 |
| EP | 0736246 | 6/2000 |
| EP | 0862360 | 3/2003 |
| EP | 1084611 B1 | 9/2004 |
| EP | 0551960 | 9/2006 |
| EP | 1263283 B2 | 3/2014 |
| EP | 3335548 A1 | 6/2018 |
| GB | 1383038 | 2/1975 |
| RU | 2244417 | 1/2005 |
| RU | 2279796 | 7/2006 |
| WO | 93/13651 | 7/1993 |
| WO | 94/23565 | 10/1994 |
| WO | 96/01041 | 1/1996 |
| WO | 96/07314 | 3/1996 |
| WO | 96/19916 | 7/1996 |
| WO | 96/19917 | 7/1996 |
| WO | 98/04121 | 2/1998 |
| WO | 98/05201 | 2/1998 |
| WO | 98/31212 | 7/1998 |
| WO | 98/46069 A1 | 10/1998 |
| WO | 00/13492 A1 | 3/2000 |
| WO | 00/13495 | 3/2000 |
| WO | 01/67852 | 9/2001 |
| WO | 01/67852 A1 | 9/2001 |
| WO | 02/15676 | 2/2002 |
| WO | 2008/030084 A2 | 3/2008 |
| WO | WO2008118068 | 10/2008 |
| WO | WO2010052156 | 5/2010 |
| WO | WO2011098454 | 8/2011 |
| WO | WO2011098994 | 8/2011 |
| WO | 2013/135842 A1 | 9/2013 |

OTHER PUBLICATIONS

International Search Report and Written Opinion dated Mar. 27, 2013, PCT Application No. PCT/EP2013/055265, 7 pages.
International Search Report and Written Opinion dated Mar. 14, 2013, PCT Application No. PCT/EP2013/055272, 9 pages.
International Search Report and Written Opinion dated May 24, 2013, PCT Application No. PCT/EP2013/055288, 9 pages.
German Search Report dated Feb. 17, 2012 from German Patent Application No: 102011001404.7, 6 pages.
International Preliminary Report on Patentability and Written Opinion for PCT/EP20121054645, English translation dated Sep. 24, 2013, 6 pages.
Non-Final Office Action dated Sep. 24, 2015, U.S. Appl. No. 14/002,076, 8 pages.
Non-Final Office Action dated Feb. 10, 2017, U.S. Appl. No. 15/247,544, 7 pages.
Non-Final Office Action dated Apr. 7, 2016, U.S. Appl. No. 14/002,610, 7 pages.
Non-Final Office Action dated Jun. 2, 2017, U.S. Appl. No. 14/002,610, 10 pages.
Final Office Action dated Dec. 19, 2016, U.S. Appl. No. 14/002,610, 6 pages.
Final Office Action dated Feb. 27, 2017, U.S. Appl. No. 14/384,678, 15 pages.
Non-Final Office Action dated Mar. 11, 2016, U.S. Appl. No. 14/384,678, 15 pages.
Non-Final Office Action dated Dec. 7, 2016, U.S. Appl. No. 14/384,676 15 pages.
International Search Report for PCT/EP2015/061087 dated Sep. 7, 2015, 7 pages.
Non-Final Office Action dated Jan. 4, 2018, U.S. Appl. No. 14/384,678, 29 pages.
German Search Report dated Feb. 2, 2015 for German Application No. 10 2014 107 124.7, 6 pages.
Extended European Search Report for EP Application No. 18154736 dated May 2, 2018, 1 page.
Final Office Action dated Sep. 21, 2018, U.S. Appl. No. 14/384,678, 23 pages.
Non-Final Office Action dated Sep. 12, 2019, U.S. Appl. No. 15/971,187, 32 pages.
Non-Final Office Action dated Feb. 19, 2020, U.S. Appl. No. 15/720,405, 38 pages.
Final Office Action dated Apr. 14, 2020, U.S. Appl. No. 15/971,187, 12 pages.
Germania Home Page on Jul. 28, 2005, http://www.germaniadairy.com/, 1 page.
Boumatic Home Page on Jul. 28, 2005, http://www.bou-matic.com/html/gallery/rotary_curtin.htm, 2 pages.
WestfaliaSurge brochure "External Autorotor" dated Jan. 2001, 22 pages.
Germania sales brochure "Introducing—Profundly Productive PRO-TIME Parlors From Germania: Milking Parlors for the Next Century—and Beyond?" printed Nov. 1996, 8 pages.
Germania Dutch brochure "Vele Nederlandse melkveehouders ginge u voor!: Germania Melksystemen de trots van eleke veehouder", 6 pages.
Offer of Germania milking systems VOF, Oude Lievervelderweg2. 7137 MA Lievelde, NL, to Mr Hummel, Am Milchweg 01, Ivenack, DE, dated Aug. 12, 1997, 10 pages.
Fax cover sheet of a Germania milking system VOF fax,Lievelde, NL, sent to M. Hummel Jul. 10, 1997, 1 page.
Germania Final Quality Control/Inspection Certificate, dated Oct. 9, 1999, 1 page.
Germania technical drawing titled "Protime I Stall" dated May 10, 1997, 1 page.
Photos of a Germania double-herringbone parlor installed in Hummel GmbH cattle plant in 1999, 13 pages.
Westfalia Landtechnik GmbH advertising brochure "AutoRotor—Milk Carousel Systems" publication date Feb. 1997, 12 pages.
Westfalia Separator AG order confirmation and invoice dated Aug. 17, 1995, 22 pages.
Photos of a Wesffalia Separator AG milking parlor installation at the Birkholz Estate, dated Sep. 2018, 7 pages.
"Reflections: A history of DeLaval" 5 pages.

(56) References Cited

OTHER PUBLICATIONS

Non-Final Office Action dated Apr. 24, 2019, U.S. Appl. No. 14/384,678, 22 pages.

* cited by examiner

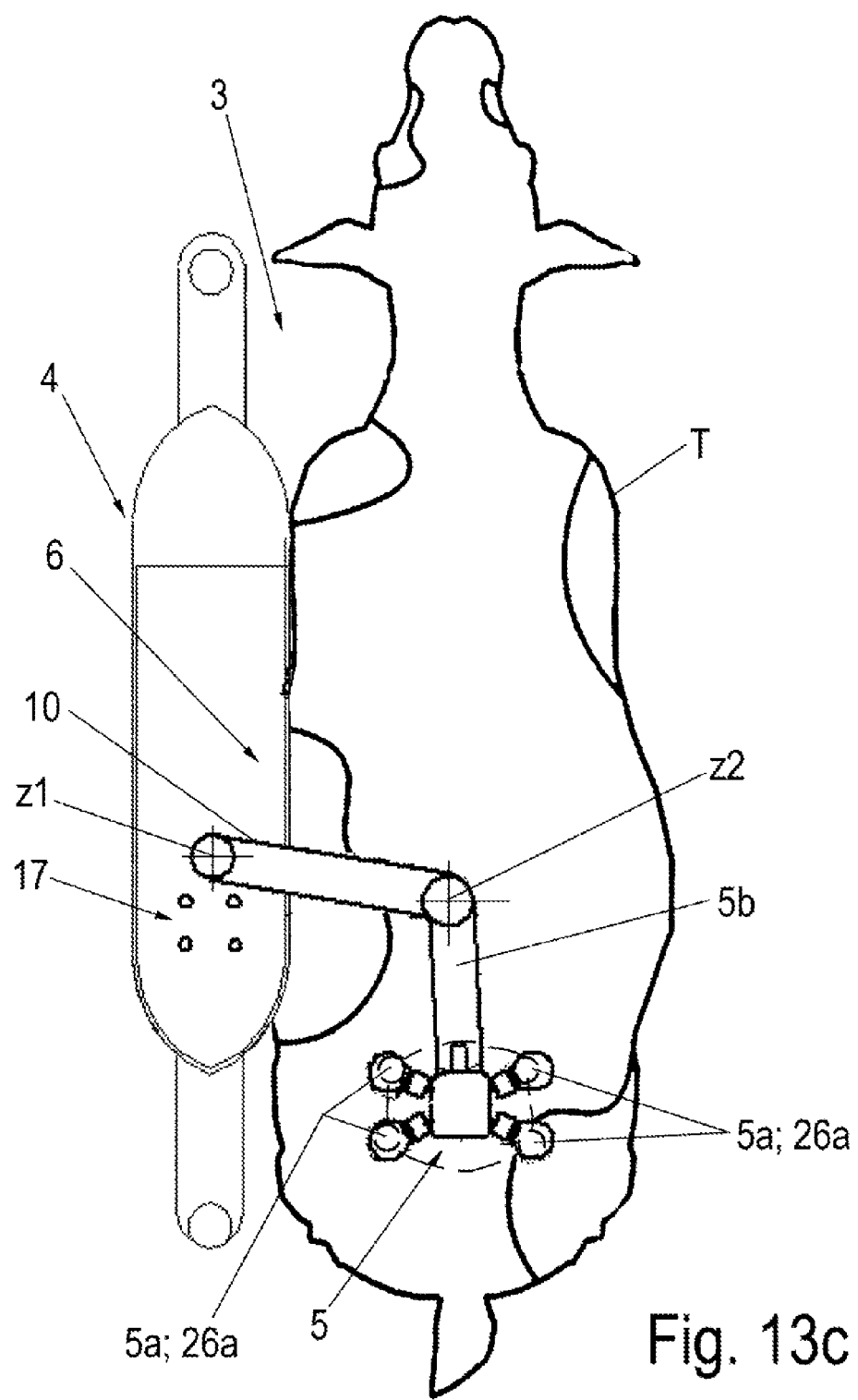

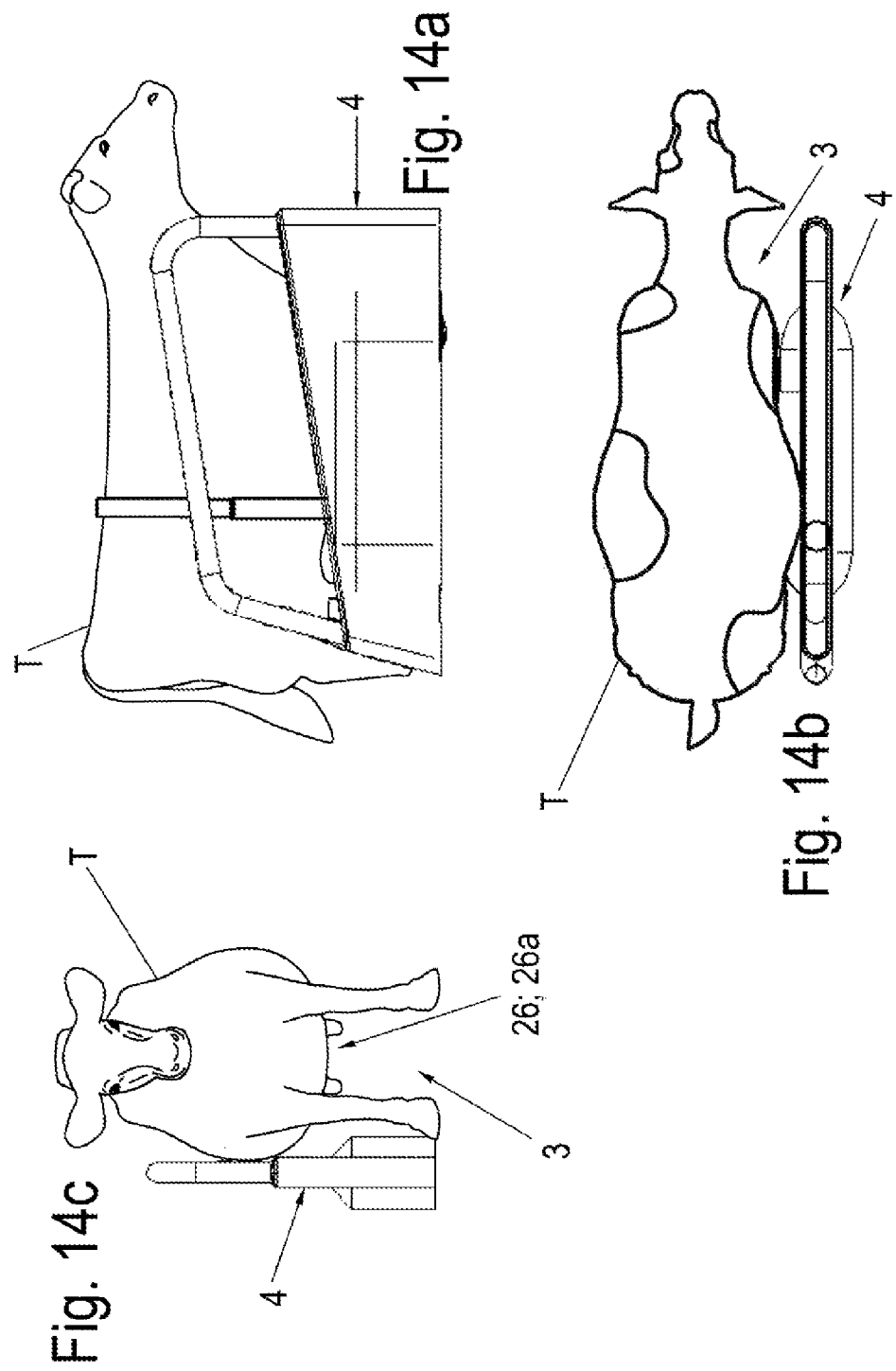

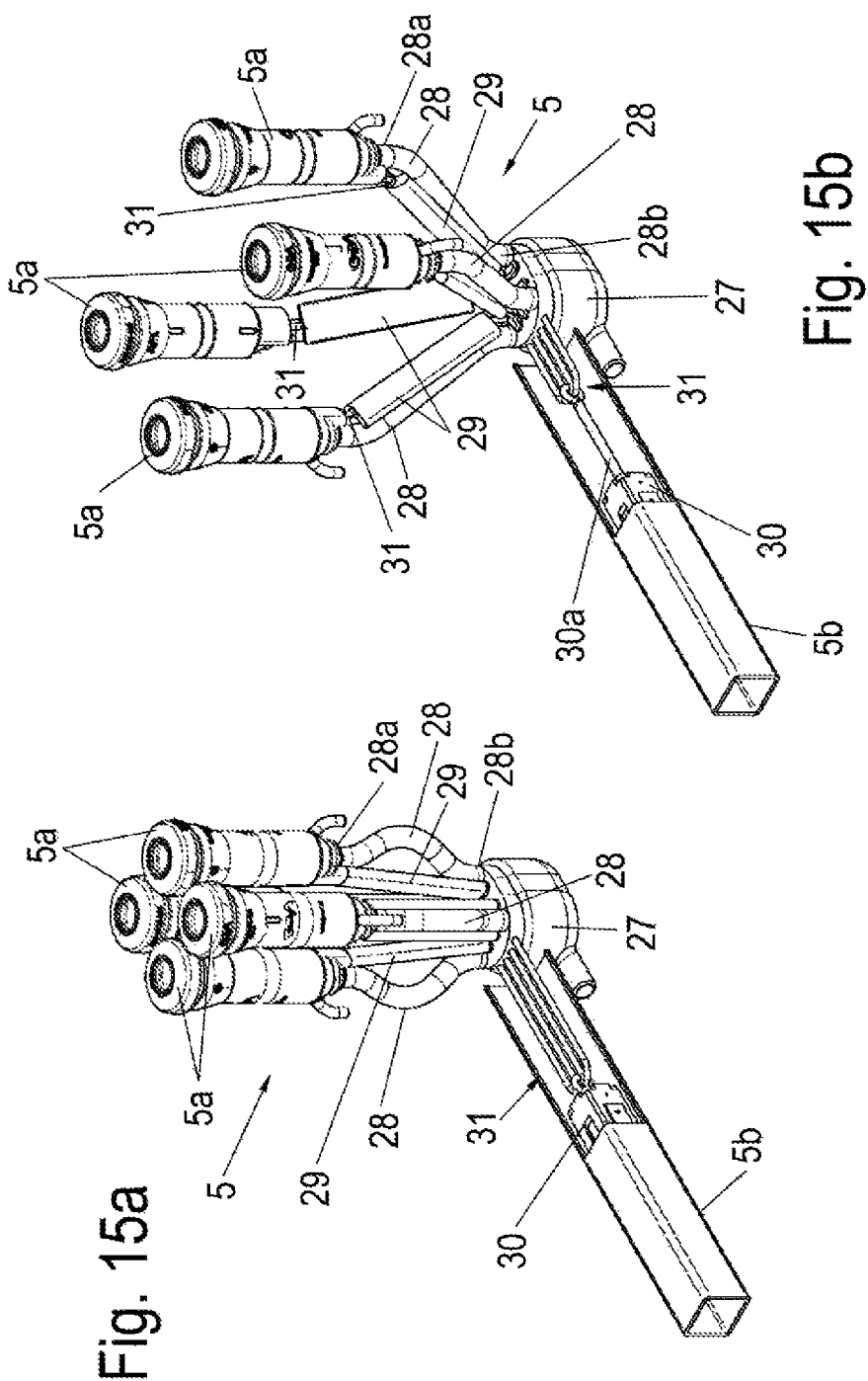

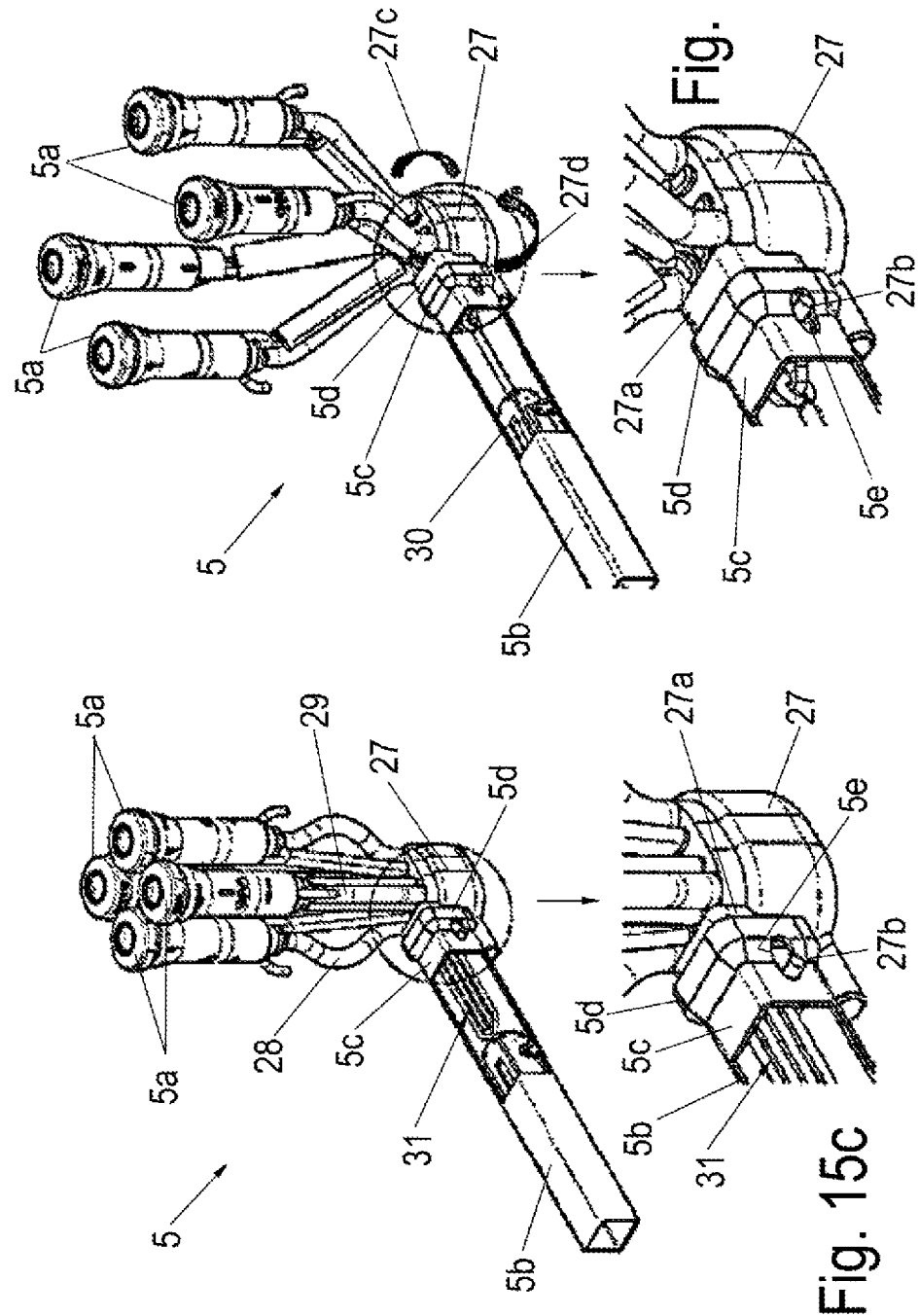

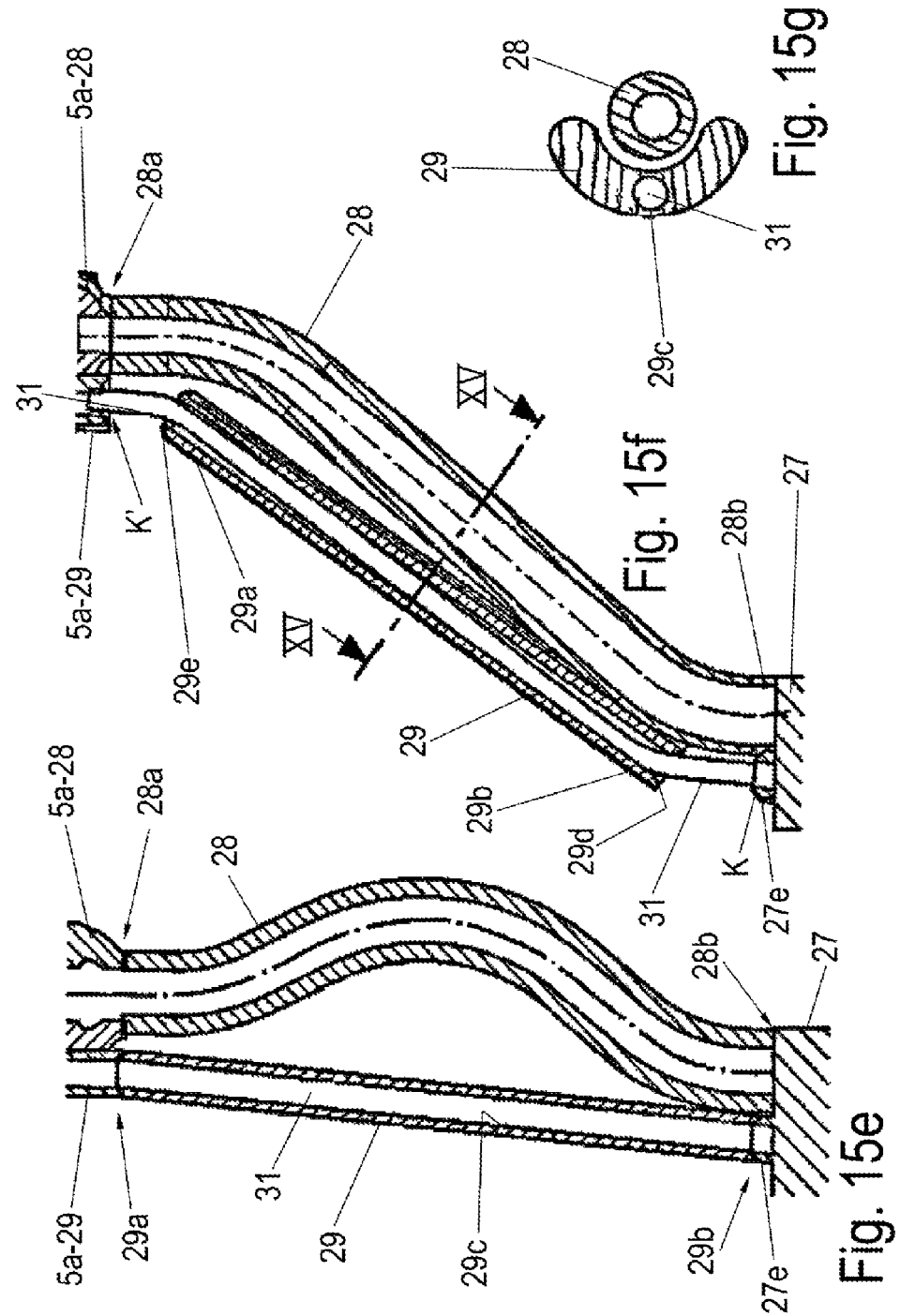

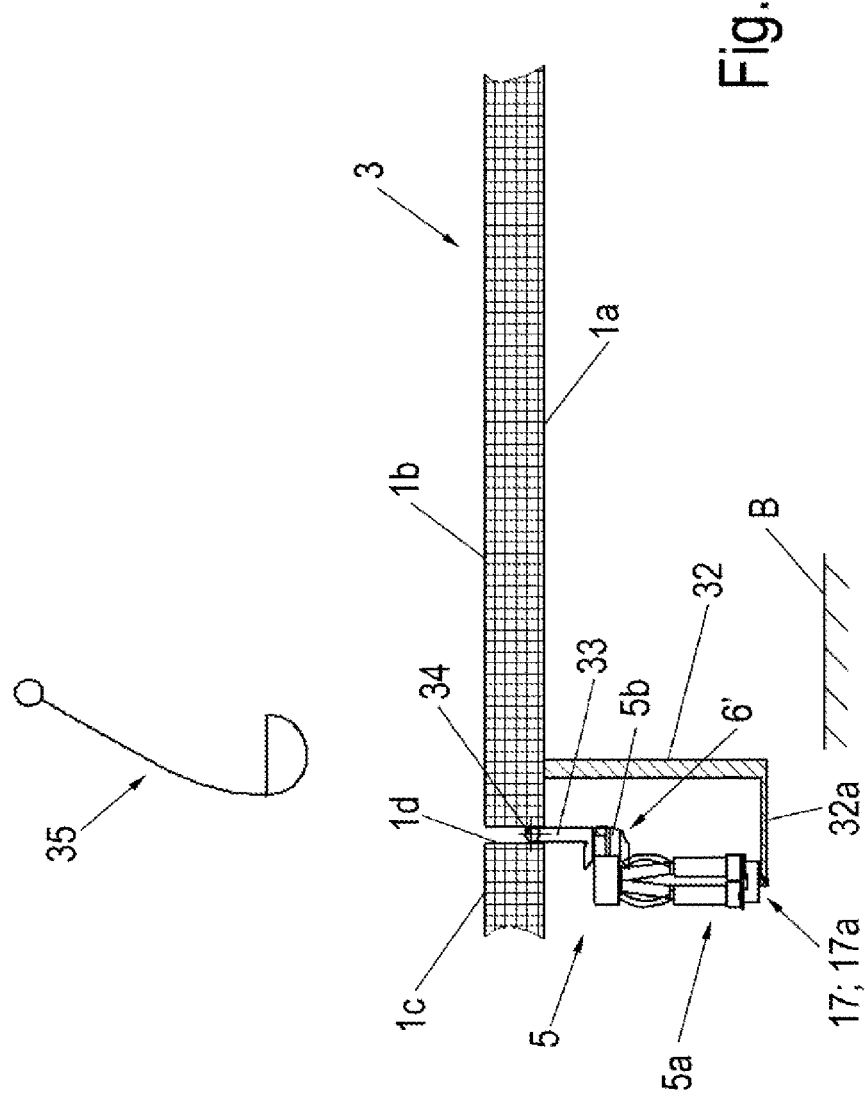

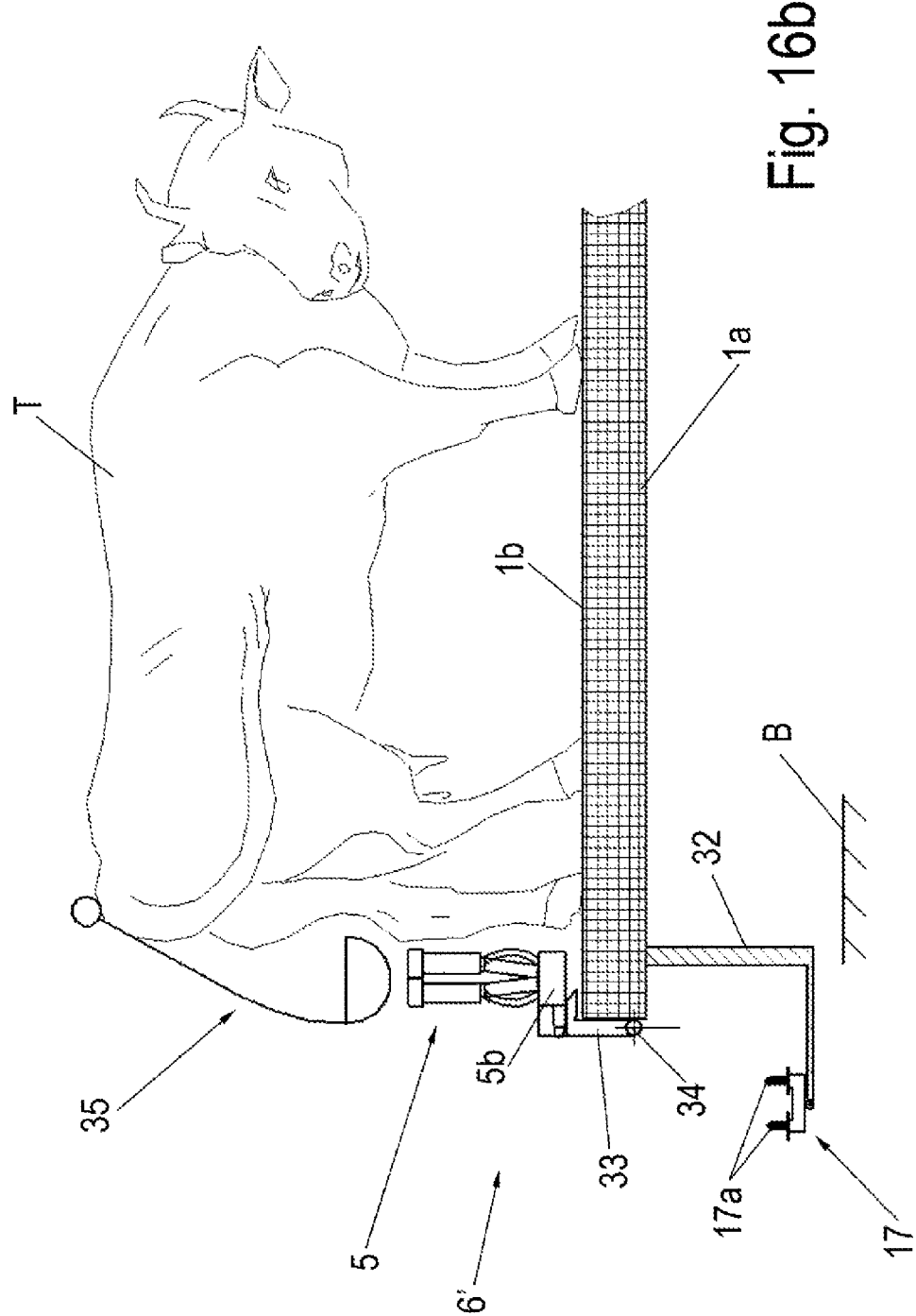

SPACE DIVIDER OF A MILKING PARLOR ARRANGEMENT, AND MILKING PARLOR ARRANGEMENT

The invention relates to a space divider of a milking parlor arrangement. The invention also refers to a milking parlor arrangement.

A milking parlor arrangement of this type is used for mechanically milking milk-producing animals. Examples of milk-producing animals include cows, goats, sheep, etc. The milking parlor arrangement has milking parlors which are separated by space dividers. The milking operation can be automated by means of what are referred to as milking robots. Rotary milking parlors, for example, are used.

The term milking parlor arrangement is understood as meaning arrangements of milking parlors, wherein an angular position of an animal to be milked or an angular position of an imaginary longitudinal axis of an animal to be milked in a milking parlor with respect to a reference point or a reference line can be between 0° and 90°. A pit or an area occupied by the milking staff is used, for example, as a reference point. The longitudinal side of a straight pit or a tangent of a circular pit is used, for example, as a reference line.

Milking parlor arrangements are, for example, movable and immovable milking parlor arrangements. Movable milking parlor arrangements are, for example, rotary milking parlors in the form of external milking means and internal milking means, both types with an arbitrary direction of rotation. What are referred to as side-by-side milking parlors can also be designed as movable milking parlor arrangements. Furthermore, group milking parlors, such as, for example, herringbone milking parlors and tandem milking parlors, are also immovable. This listing is only by way of example and is not limiting.

EP 1 084 611 B1 describes a robot arm structure with a pivotable supporting unit for a milking cluster. The structure is movable on one or more rails along one or more milking boxes.

The existing automation technology is not suitable, or is suitable only to a limited extent, for large installations because of a low throughput. The ever more stringent requirements in particular for high throughput figures and continuous operation necessitate, in the case of modern milking robots, which are complex and expensive, common use for several milking stalls. This may have a disadvantageous effect, among other things because of a high degree of complexity and associated high failure probability, discontinuous operation, areas blocked to the staff (safety in the robot area).

Against this background, it is the object of the invention to provide an improved arrangement and a milking parlor and to improve the possible installation throughput.

A space divider according to the invention of a milking parlor arrangement for at least one milking parlor for milking milk-producing animals, wherein the space divider is arranged approximately parallel to a longitudinal axis of the animal to be milked, has an with a milking cluster, which is adjustable from a parking position into a working position and back. The arm device here with the milking cluster is arranged in the parking position in the space divider and is adjustable into the working position laterally with respect to the animal to be milked between the front and hind legs thereof in fully automatic operation or semi-automatic operation.

A further space divider according to the invention of a milking parlor arrangement for at least one milking parlor for milking milk-producing animals is arranged on a longitudinal side of the milking parlor and has an arm device with a milking cluster, which is adjustable from a parking position into a working position and back. The arm device with the milking cluster is arranged in the parking position in the space divider and is adjustable into the working position laterally with respect to an animal to be milked between the front and hind legs thereof in fully automatic operation or semi-automatic operation.

In the case of a milking parlor arrangement with rectangular milking parlors which are arranged next to one another and in each case have parallel longitudinal sides, as is the case, for example, in a side-by-side arrangement, the space divider is arranged parallel to an imaginary longitudinal axis of the animal to be milked. In this case, it is assumed for the purposes of simplification that, in an ideal state, the animal to be milked stands still with its imaginary longitudinal axis during the milking operation.

In the case of a milking parlor arrangement with milking parlors arranged in a circular manner, such as in the case of a rotary milking parlor, the longitudinal sides of the milking parlors are not parallel. In this case, the longitudinal sides are portions of radii of a circle of the rotary milking parlor and, in an imaginary extension, intersect in the center point of said circle or in the pivot point of the rotary milking parlor, where they form a center angle. In the ideal case, the imaginary longitudinal axis of the animal to be milked also extends through the pivot point and bisects the center angle. This case is abbreviated hereinbelow by the term "approximately parallel".

An animal to be milked can enter the milking parlor, which is provided with the space divider, without coming into contact with the arm device. Only when the animal is in the milking parlor is the milking cluster adjusted from the side into the working position under the animal. In one embodiment, the space divider is designed in such a manner that no additional space is required. As a result, the advantage is afforded that the animals can continue to stand belly to belly. This has further advantages: firstly, in this way a large number of animals can be milked in the smallest possible space, as a result of which costs for the milking parlor arrangement and also for the associated building can be kept low. Secondly, the distances to be covered by the milking staff and the animals remain shorter, i.e. time is saved.

With the adjusting of the arm device with the milking cluster from the side between the front legs and hind legs under the udder of the animal, the milking cluster is moved outside the region between the hind legs. In the region between the hind legs, there is a greatly increased risk of contamination by animal excrement. This region is now avoided, which considerably reduces contamination of the milking cluster and of the arm device. As a result, cleaning times and therefore costs are also saved.

A further advantage of this compact method of construction is that it is possible to retrofit the space divider into existing installations without losing milking parlors/milking stalls.

Staff can intervene in the milking operation at any time and without being obstructed by devices, i.e. the supporting arm device and accessories, and has easy access. Additional protection devices are not required. If the milking parlor arrangement is a rotary milking parlor, the latter can maintain the rotation thereof without interruption since the milking staff are able to intervene, for example, anywhere from the outside. Any risk to the milking staff is considerably reduced.

In one embodiment, in the fully automatic operation, the arm device is adjustable from the parking position in the working position into a positioning position for automatically positioning the milking cluster onto the teats of the animal to be milked, wherein the milking cluster has at least one position sensor. The milking cluster is moved here by the arm device under the udder of the animal to be milked, and the teat cups are automatically positioned onto the teats with the aid of the position sensor for detecting the teats, the arm device and the drive unit. This operation is also referred to as an automatic operation.

Each of the teat cups here can be positioned individually.

Alternatively, it is provided, in another embodiment, that, in the semi-automatic operation, the arm device is adjustable from the parking position into the working position, wherein the working position is a fixed preliminary position which can be determined beforehand by stop means, wherein, in the preliminary position, the milking cluster is in a position favorable for a milker, but also for a robot device. The milking cluster here is adjusted with the aid of simple drive means, for example pneumatic cylinders, provided with adjustable stops into a fixed preliminary position, which is favorable in terms of handling for the milking staff or the robot device, under the udder of the animal to be milked. The milker standing behind the animal can then simply and easily grasp the teat cups and position them onto the teats. As soon as the first teat cup is positioned on a teat, this is identified, for example, with the aid of a pneumatic pressure sensor and the milking cluster is released from the fixed preliminary position into a free horizontal position. In a vertical position, the milking cluster remains in a suspended position, as in the case of the automatic positioning. It is thus ensured that, as in the case of the automatic positioning, after the positioning operation the milking cluster follows the movement of the animal to be milked.

In this what is referred to as semi-automatic milking, said preliminary positioning of the milking cluster with the arm device is designed in such a manner that the milker only has to move the teat cups very slightly for positioning on the teats and has to expend almost no force. This saves on force and time. Since, in this embodiment, neither a position sensor nor a drive device for activating all of the teat positions is required, but rather only a simple drive is required, this embodiment can advantageously be cost-effective. A further advantage here is that this semi-automatic embodiment can be upgraded into the automatic embodiment. This is possible because of a plurality of identical components.

In one embodiment, in the parking position and in the preliminary position, the teat cups of the milking cluster are held upright and close to one another above a collecting piece at a distance from said collecting piece, wherein the teat cups of the milking cluster are releasable to a limited extent from the preliminary position into a milking position, in which the teat cups of the milking cluster are movable to a limited extent, and therefore the distance of the teat cups of the milking cluster from the collecting piece is increased in the milking position, and are bringable back again into the preliminary position. In the preliminary position, the teat cups are thus brought into what is referred to as a presentation position close to one another for easy and rapid grasping by a milker or a robot. Said teat cups here can all be grasped at once.

The distance here of each teat cup in the parking position and in the preliminary position from the collecting piece is determined by in each case at least one segment element which is arranged in each case between each teat cup and the collecting piece. It is advantageous here if the at least one segment element has a passage through which at least one traction mechanism is guided, said traction mechanism being fastened by one end to the associated teat cup and being coupled by the other end to an actuating device. Such a traction mechanism can thus be integrated easily and in a space-saving manner.

In a further embodiment, the at least one traction mechanism can be tensioned by means of the actuating device in the parking position and in the preliminary position, wherein, in the parking position and in the preliminary position, the associated teat cup of the milking cluster is held upright above the collecting piece at the distance from said collecting piece. It is advantageous here that the traction mechanism is, for example, a cable or a chain which is easily tensionable.

In another embodiment, the collecting piece is fastened to a milking cluster carrier at a connection between the collecting piece and the milking cluster carrier, wherein said connection is held firmly together in the parking position and in the preliminary position and is loosened in the milking position. It is furthermore advantageous in this connection that, in the milking position, the collecting piece is loosened in such a manner that it is movable within certain limits relative to the milking cluster carrier. The advantage of this embodiment consists in that, with a small stroke of the actuating device, which may amount to, for example, 15-20 mm, not only can a maximum freedom of movement of the teat cups in the milking position be achieved, but also a possibility of moving the collecting piece relative to the milking cluster carrier, in a manner limited, for example, by a slotted guide, can make it easier, for example, to position the teat cups, in particular in the case of what are referred to as stepped udders.

In one embodiment, the actuating means is a pneumatic cylinder, a hydraulic cylinder or an electric motor drive.

The arm device has an upper arm and a lower arm which is coupled pivotably thereto. This results in a collapsible construction which, in the parking position, is accommodated and protected in the space divider.

In another embodiment, the lower arm can be designed as a milking cluster carrier with the milking cluster, and therefore a simple and compact construction, in particular for a semi-automatic embodiment, is produced.

In one embodiment, the arm device is connected to a drive unit which is arranged on the space divider outside the reach of, or above, the animal to be milked. However, the drive unit may also be arranged below a milking platform. All of the drive and control elements can therefore be provided in a central and integrated manner in the space divider.

In a further embodiment, the drive device has at least one servomotor. The at least one servomotor can be coupled to a suitable gearing. In yet another embodiment, the drive device has at least one direct drive.

If the drive unit has at least one torque motor, a certain degree of elasticity is produced. Overload protection of the arm device can therefore be assisted, for example against kicking by the animal to be milked. Since the torque motors do not require a gearing, the arm device can recede to a certain extent in the event of being kicked. Damage is reduced, both to the arm device and to the animal. The torque motors can yield when the arm device is manipulated, for example by being touched by the animal's legs. Furthermore, emergency milking is also possible if the milking cluster has to be applied by the milker without any current, since resistances of gearing and motor do not have to be overcome in the process. Even if the torque motors are currentless in terms of drive, the angle sensors thereof can be switched on, as a result of which information is always present about the position thereof and the position of the arm device with the milking cluster.

Of course, other drives, for example pneumatic cylinders, can also be used.

A further advantage here is that, as soon as all of the teat cups have been positioned on the teats of the udder, the motors can be switched currentlessly. And, as a result, smooth running of the arm device is achieved, and therefore the milking cluster can follow the movements of the animal. Negative lever forces are thereby not produced on the teats of the udder of the animal.

A further advantage of this what is referred to as passive tracking in contrast to active tracking with the aid of the drive unit is a large saving on energy, since energy is required only for the positioning of the milking cluster. This may be, for example, only approx. 5% of the milking time of an animal.

In a further embodiment, in the parking position, the arm device with the milking cluster is arranged in the space divider in an opening in a cladding of the space divider (4). This produces a compact and narrow construction.

In an alternative, the arm device with the milking cluster can be arranged in the parking position within a section of the space divider that is arranged below the milking parlor. Said section of the space divider can be formed here through a milking platform or around an edge thereof. For this purpose, the milking platform can also have a suitable cutout.

Furthermore, the opening in the cladding of the space divider with the arm device, which is arranged therein in the parking position and has the milking cluster, can be closeable with a protective covering. As a result, a risk of injury to the animals, in particular to unsettled animals, can be reduced.

In a further embodiment, a cleaning device for the milking cluster can be arranged in the space divider. The term cleaning device is also to be understood as meaning that the teat cups can be cleaned internally and externally. Of course, disinfection before and after milking is also possible. The milking cluster can also be disinfected in between. As a result, the compact construction is improved with additional functions. A requirement of time for the cleaning is reduced, i.e. movement distances to cleaning points are dispensed with, since this can be undertaken in situ.

In addition, a teat treatment device which disinfects the teats before and after milking can also be provided on the milking cluster.

In another embodiment, the arm device can have a parallel guide for the milking cluster. If the parallel guide has sliding rods and/or coupling rods, or is formed from parallel guide driving elements, neither measuring systems nor driving systems are necessary for a parallel guide. A narrow and space-saving construction is particularly advantageous if the parallel guide is arranged within the arms of the arm device. In addition, additional protection devices are not required.

In another embodiment, the parallel guide driving elements can be traction mechanisms, such as, for example, belts. The latter can assist the overload protection.

In a further embodiment, the arm device has at least one traction mechanism drive. Belts as traction mechanisms are extremely quiet. Toothed belts are advantageous for precise positioning.

In yet another embodiment, the space divider together with the functional units and components thereof forms a preassembled, complete unit. As a result, rapid installation and removal and also retrofitting of existing milking parlor arrangements can easily take place. The functional units and components of the space divider are the arm device and the milking cluster. Further ones can be the drive unit(s), the cleaning device, the protective covering, etc.

A milking parlor arrangement for milking milk-producing animals can be provided with the above-described space divider.

An alternative milking parlor arrangement with at least one milking parlor for milking milk-producing animals, and with at least one space divider, wherein the space divider is arranged approximately parallel to a longitudinal axis of the animal to be milked, said milking parlor arrangement comprising an arm device with a milking cluster, which is adjustable from a parking position into a working position and back, is designed in such a manner that, in the parking position, the arm device with the milking cluster is arranged below a milking platform and is adjustable into the working position behind the animal to be milked between or behind the hind legs thereof.

A further embodiment of a milking parlor arrangement with at least one milking parlor for milking milk-producing animals, and with at least one space divider is designed in such a manner that the space divider is arranged on a longitudinal side of the milking parlor. Said milking parlor arrangement has an arm device with a milking cluster, which is adjustable from a parking position into a working position and back. In the parking position, the arm device with the milking cluster is arranged below a milking platform and is adjustable into the working position behind the animal to be milked between or behind the hind legs thereof.

An even narrower embodiment of the space divider can thus be made possible.

The term "behind the hind legs thereof" is to be understood as meaning that it is not the region below the animal, i.e. below the belly thereof between hind legs and front legs, which is meant by this, but rather the region behind the animal.

In a further embodiment, in semi-automatic operation, the arm device is adjustable from the parking position into the working position, wherein the working position is a fixed preliminary position which is determinable beforehand by stop means, wherein, in the preliminary position, the milking cluster is in a favorable position for a milker or for a robot device. It is thus possible for milkers and robots to execute the positioning operation in an identical arrangement, and therefore the versatility is increased.

If the arm device is pivotable about a horizontal axis from the parking position into the working position and back, the region above the milking platform can be kept completely free during circulation of the animals. In addition, the arm device is invisible to the animal.

In a further embodiment, it is provided that, in the parking position of the arm device, the milking cluster connected to the arm device is bringable into contact with a cleaning device, as a result of which a saving on space and a reduction in movement operations are obtained.

In yet another embodiment, in the parking position, the milking cluster connected to the arm device is arranged upside-down. This produces a simplified and space-saving design.

In addition, the at least one drive unit of the arm device can be arranged in the space divider.

In another embodiment, at least one robot device is provided, said robot device being designed for positioning the milking cluster in the preliminary position from the working position onto the teats of the udder of an animal to be milked. The robot device can grasp and position the milking cluster, which is in the preliminary position, with respect to the animal from the front through the legs, laterally, from below or from the rear. This results in great versatility of use.

The milking parlor arrangement can be a rotary milking parlor. The rotary milking parlor can be designed as an external rotary milking parlor.

Further developments and refinements of the milking cluster and of the milking parlor are the subject matter of the respective dependent claims.

Further advantages and details emerge from the exemplary embodiment illustrated in the figures of the drawing, in which:

FIGS. 2-2a show schematic views of a second exemplary embodiment of the milking parlor arrangement according to the invention with the space dividers according to the invention;

FIGS. 13a-13c show a bottom view of the space divider according to the invention with a variation of the arm device in various positions together with an animal to be milked;

FIG. 13b shows a preliminary position of the space divider according to the invention with the variation of the arm device according to FIG. 13a in a working position;

FIG. 13c shows a milking position of the space divider according to the invention with the variation of the arm device according to FIG. 13a in a working position;

FIGS. 14a-14c show various views of the milking parlor with the space divider according to the invention and with the variation of the arm device according to FIG. 13a;

FIGS. 15a-15b show various position of a milking cluster of the variation of the arm device according to FIG. 13a;

FIGS. 15c-15d show a variation of the milking cluster according to FIGS. 15a-15b;

FIGS. 15e-15f show partial sectional views of the milking clusters according to FIGS. 15a-15d;

FIG. 15g shows an enlarged sectional view along line XV in FIG. 15f;

FIGS. 16a-16b show schematic sectional views of a fourth exemplary embodiment of the milking parlor arrangement according to the invention of the space divider according to the invention with a further variation of the arm device in various positions;

FIG. 17 shows a schematic top view of a variant of the second exemplary embodiment according to FIGS. 2-2a;

Identical or similar functional elements are provided with identical reference signs in the figures. A vertical direction z is specified in some figures.

Figure 1:
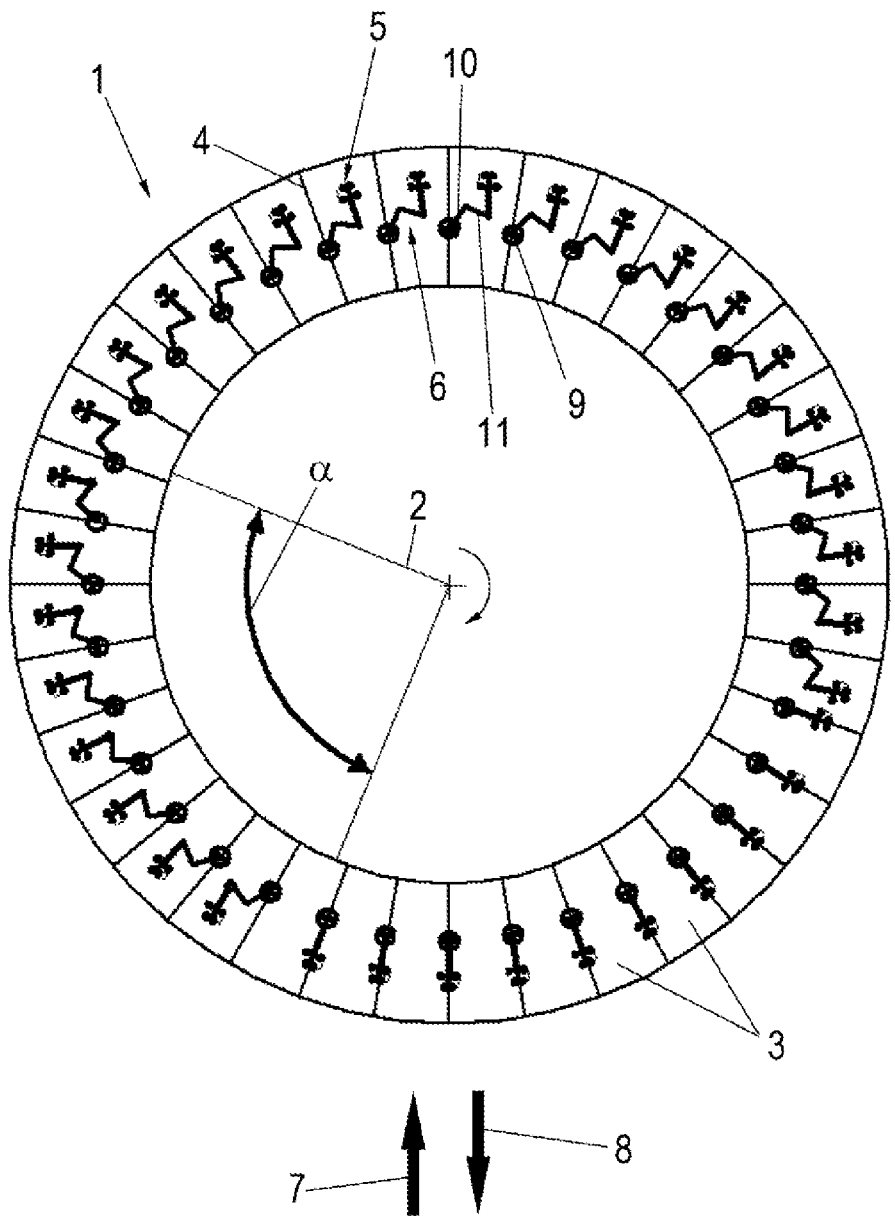
FIG. 1 shows a schematic top view of a first exemplary embodiment of a milking parlor arrangement according to the invention with a first exemplary embodiment of space dividers according to the invention.

FIG. 1 shows a schematic top view of a first exemplary embodiment of a milking parlor arrangement 1 according to the invention with a first exemplary embodiment of space dividers according to the invention.

The milking parlor arrangement 1 is constructed in the manner of what is referred to as an external rotary milking parlor. The animals to be milked stand here with their heads directed toward a center, i.e. a pivot point 2. The rotary parlor is rotatable here in a clockwise direction about the pivot point 2. Of course, in another embodiment, the rotary parlor can also be rotatable counterclockwise. In this example, thirty-six milking parlors 3 are arranged on the circumference of the rotary parlor and are separated by space dividers 4. The space dividers 4 are also referred to, for example, as space dividers and are oriented approximately parallel to the longitudinal axis of an animal to be milked. The milking parlor arrangement 1 is used for mechanically milking milk-producing animals, for example cows, by means of milking clusters 5. A milking cluster 5 is provided in each case for each milking parlor 3, said milking cluster being adjustable via an arm device 6 from a parking position into a working position under the udder of an animal to be milked, for example a cow, in a milking parlor 3. Each milking cluster 5 is arranged within a space divider 4. The positions will be explained in more detail below.

Figure 4:
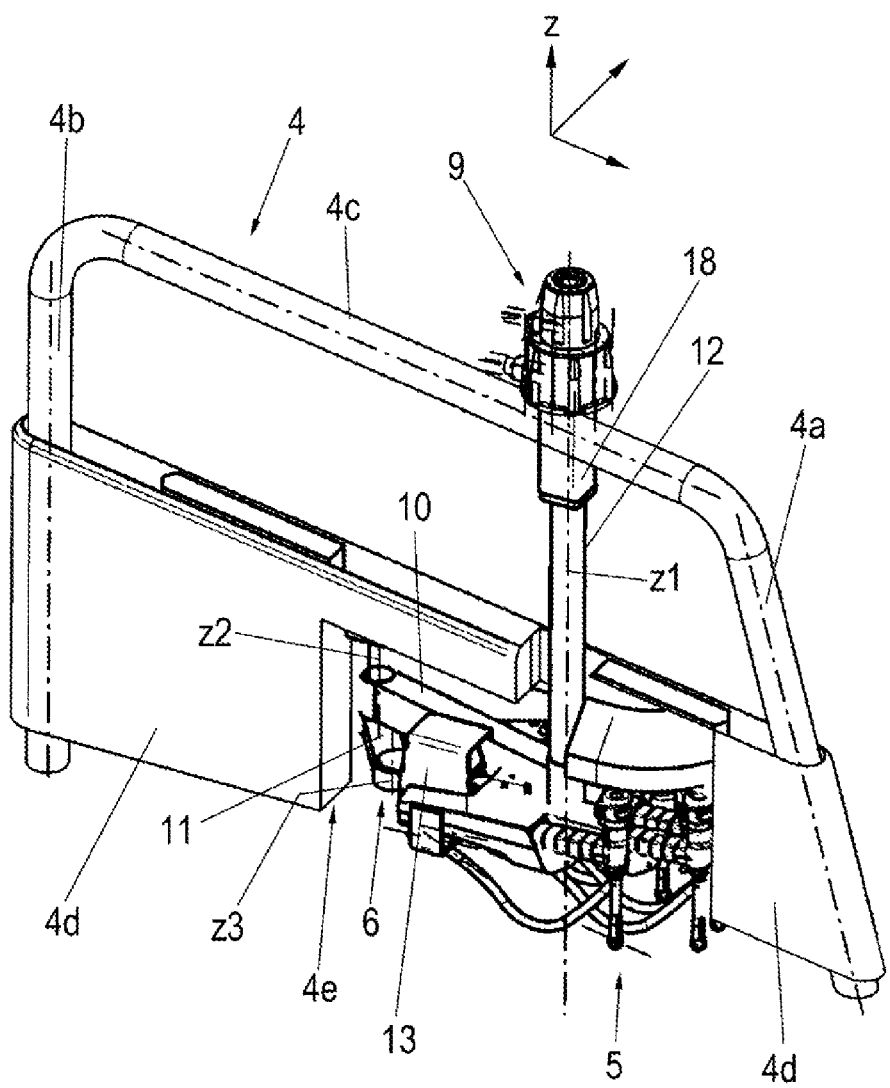
FIG. 4 shows a schematic perspective view of the space divider according to the invention with an arm device in a parking position.
Figure 5:
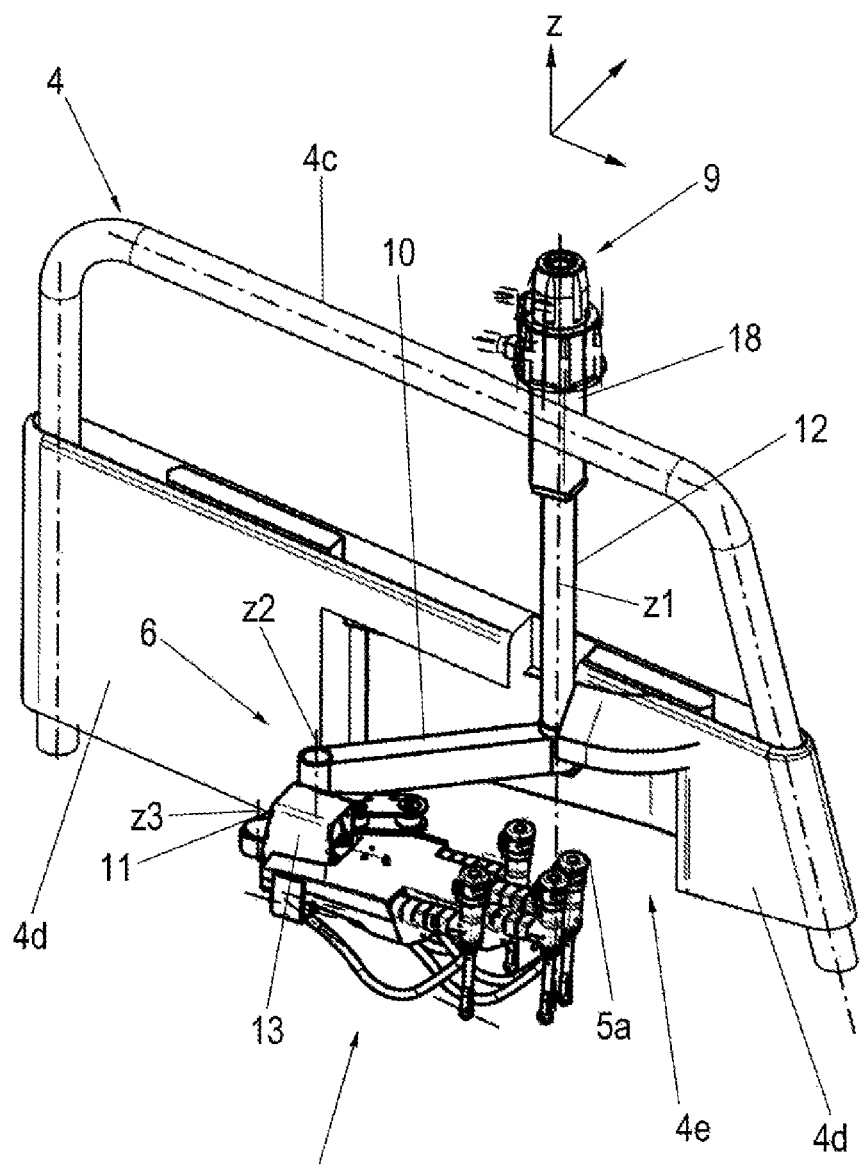
FIG. 5 shows the perspective view according to FIG. 4 with the arm device in a working position.

The animals can enter the rotary parlor via an entry 7 and can leave again via an exit 8. After an animal has entered a milking parlor 3, it is important for the animal to take up a predefined position. This is achieved by the space dividers 4 forming a restricted milking parlor 3. When the animal is standing in the milking parlor 3, the milking cluster 5 is adjusted, preferably within a circular portion, which is referred to here as the positioning region a, from the parking position in the space divider 4 into the working position from the side of the animal between the front legs and hind legs thereof under the udder of the animal and is positioned on said udder with the aid of a position sensor 13 (FIGS. 4, 5). However, positioning can basically take place at any position of the rotary parlor, for example if a milking cluster has dropped off again. In the first exemplary embodiment of the space dividers 4, a drive unit 9, which is connected to the arm device 6, is arranged on each space divider 4. After the milking operation is finished, the milking cluster 5 is removed again by means of the arm device 6 and drive unit 9 from the animal to be milked, or automatically drops into a standby position or end-of-milking position and is then adjusted into the parking position.

On the outer circumference of the milking parlor arrangement 1, all of the milking parlors 3 are freely accessible by a milker, and therefore said milker is able to intervene in a milking operation at any time. This working region is therefore kept free of additional devices. Risk to the milker is minimized. The rotary milking parlor can remain constantly in rotation.

The milking cluster 5 is moved laterally toward the animal to be milked in the milking parlor 3 and is positioned from the side of the animal under the udder thereof.

The arm device 6 has an upper arm 10 and a lower arm 11 and has the function of supporting the milking cluster 5 so as to balance the weight and to be smooth-running such that it follows the movements of the animal to be milked.

A detailed description of the arm device 6 is provided below in more detail in various variations.

Figure 2:
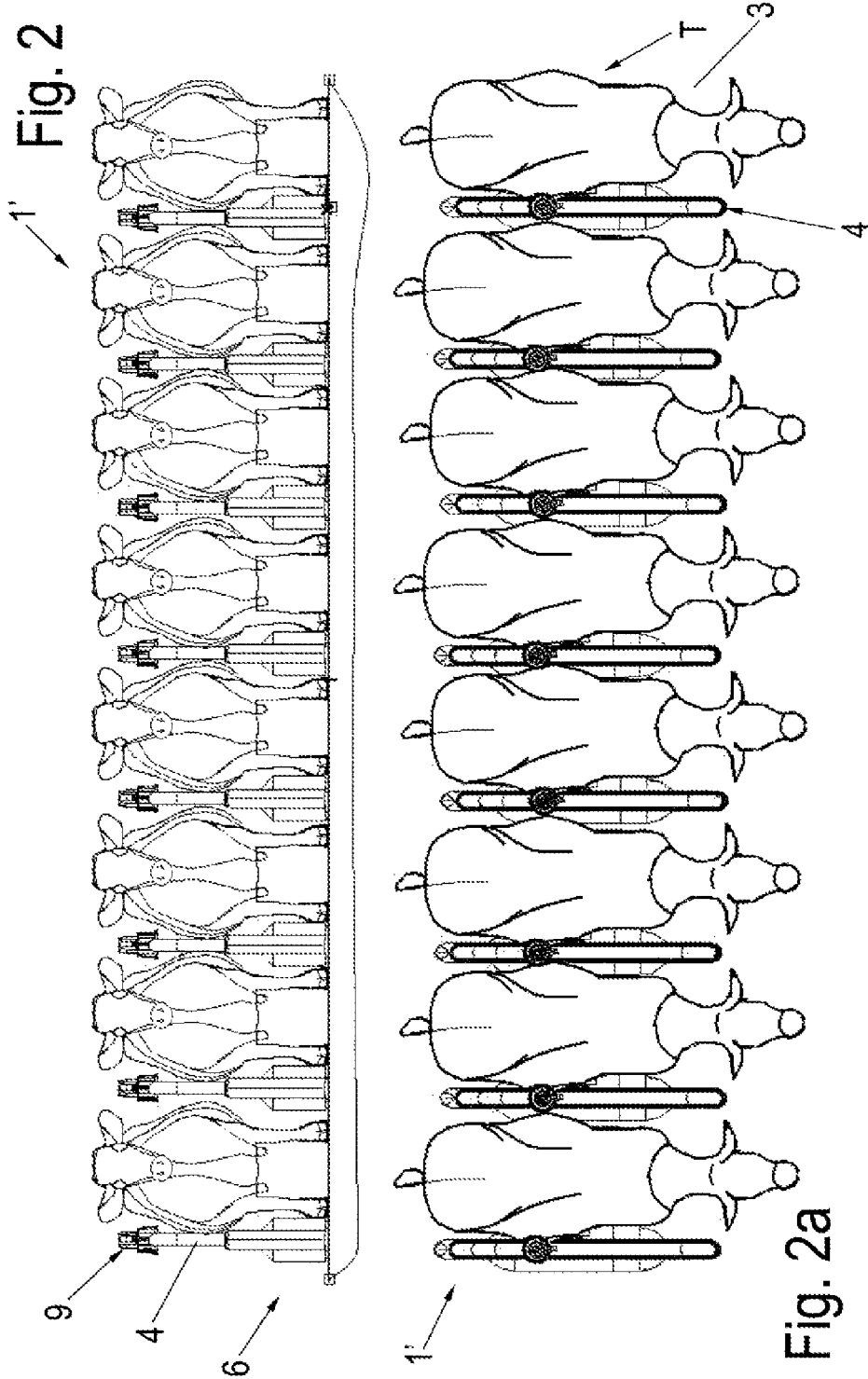

FIGS. 2 and 2a illustrate schematic views of a second exemplary embodiment of the milking parlor arrangement 1' according to the invention with the space dividers 4 according to the invention. FIG. 2 shows a front view and FIG. 2a is a top view. The milking parlors 3 here are arranged next to one another and are also separated by space dividers 4. Animals T which are to be milked and which are cows here are located in the milking parlors 3. A drive unit 9 for one arm device 6 in each case with the milking cluster 5 is arranged on each space divider 4.

Figure 3:
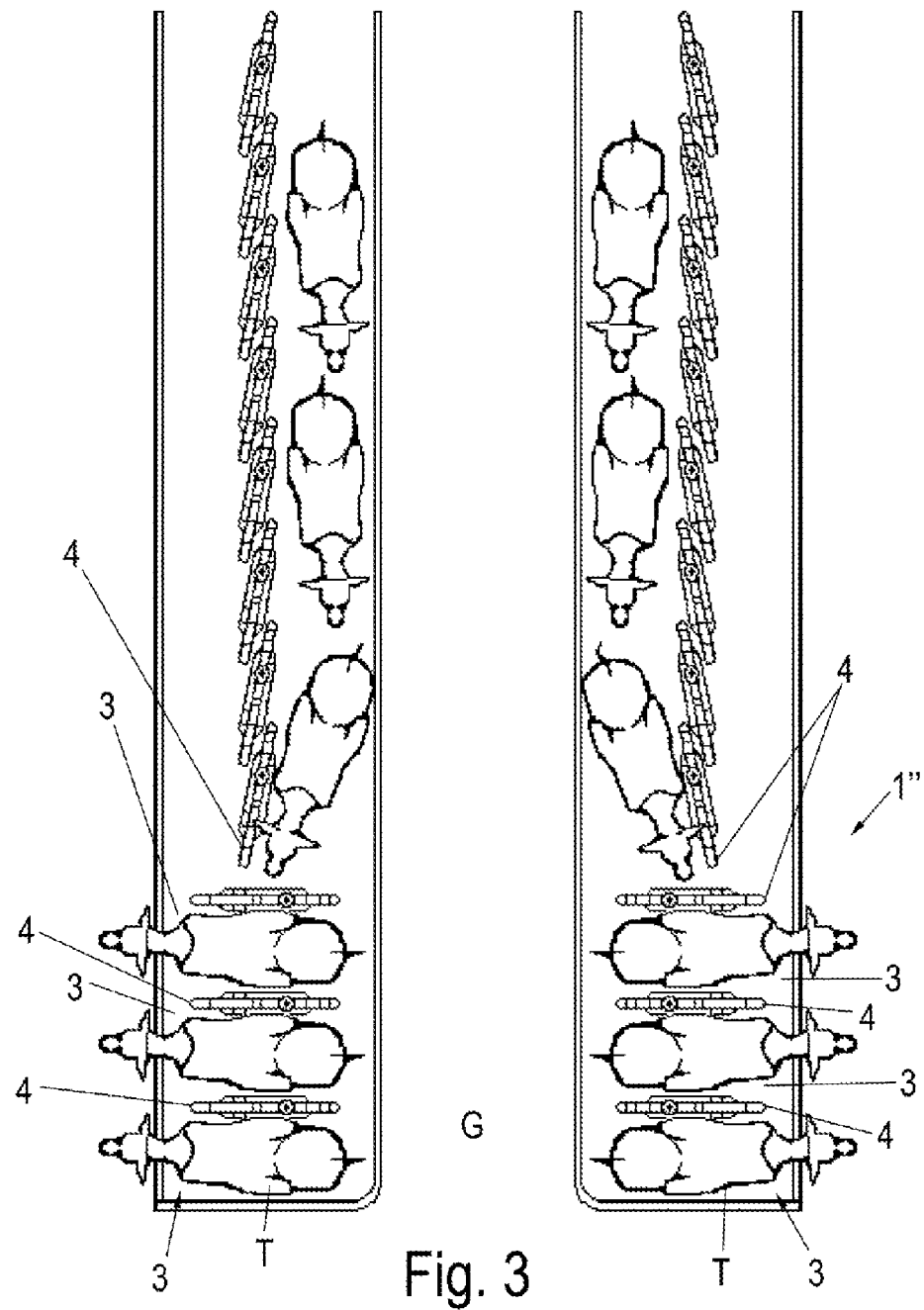
FIG. 3 shows a schematic top view of a third exemplary embodiment of the milking parlor arrangement according to the invention with the space dividers according to the invention.

FIG. 3 shows a schematic top view of a third exemplary embodiment of the milking parlor arrangement 1" according to the invention with the space dividers 4 according to the invention. In this third exemplary embodiment, the space dividers 4 are arranged so as to be pivotable in a U-shaped passageway, wherein they initially form a passage by being pivoted in a line and guiding the animals T. As soon as the first animal has arrived at the end of the U-shaped passageway, the first space divider on the left in FIG. 3 pivots counterclockwise in such a manner that a milking parlor 3 is formed. The pivoting can take place either in a controlled manner via a rotary actuator or automatically as a result of the movement of the animal T. These operations proceed until all of the animals are placed in the milking parlor arrangement 1". Here too, a drive unit 9 for one arm device 6 in each case with the milking cluster 5 is arranged on each space divider 4. A docking (which is explained in more detail further below) of drive units 9', which are moved over an upper or lower rail, is also possible here.

Two U-shaped passageways, which are separated by what is referred to as a pit G, are arranged in a mirror-inverted manner here. The pit G is the area occupied by a milker who, from here, can monitor the milking on both sides and can intervene in a helpful manner without being obstructed by the movement of the arm devices 6.

Figure 6:
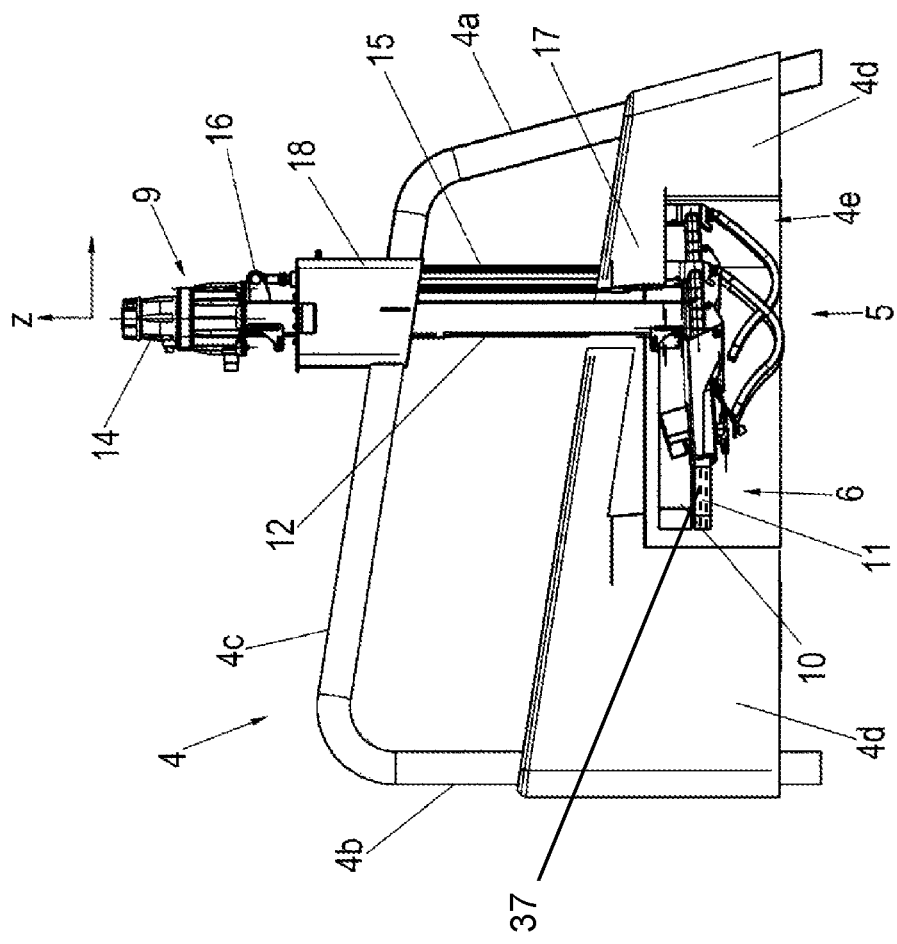
FIG. 6 shows a side view of the space divider according to the invention.

FIG. 4 is a schematic perspective view of the space divider 4 according to the invention with the arm device 6 in the parking position. FIG. 5 shows a schematic perspective view of the space divider 4 according to the invention with the arm device 6 in a working position. FIG. 6 is a side view.

The space divider 4 here is designed as a housing in which the entire actuator technology for the arm device 6 and the milking cluster 5, and also control elements and drive units, are arranged. The space divider 4 is thus a complete unit which can be preassembled at a given location and is completely interchangeable or retrofittable.

The space divider 4 here is a tubular structure with a front post 4a, which is slightly inclined, and a rear post 4b. The posts 4a, 4b are connected via a horizontally extending horizontal bar 4c. At approximately half-height, the posts 4a, 4b are enveloped by a cladding 4d which extends approximately down to the feet of the posts 4a, 4b. The posts 4a, 4b and the horizontal bar 4c can also be produced integrally from bent tube. An opening 4e is made in the front half of the cladding 4d, as a result of which a receptacle is produced in the cladding 4d within the space divider 4, which receptacle can also bulge toward the sides (see, for example, FIG. 7) such that said receptacle receives and surrounds the milking cluster 5 parked therein. An additional protective covering (not shown) for protecting the milking cluster 5 can be attached at the side of the opening 4e. When the milking cluster 5 is activated, said protective covering can be displaced, for example, in the direction of the space divider 4 in order to expose the opening 4e. In a further embodiment, the protective covering can also be attached to the milking cluster 5. The protective covering thus remains fixed on the milking cluster 5 and also moves with said milking cluster. It can also be made smaller in the working position, for example by automatically collapsing or sliding together.

The milking cluster 5 is attached to the lower arm 11 of the arm device 6. In this exemplary embodiment, the milking cluster 5 has four teat cups 5a. Each of the four teat cups 5a can take up a different position independently of one another and can be automatically fixed or connected so as to be freely movable. Consequently, the teat cups 5a can take up individual positions in the positioned state, since the teat cups 5a are positioned individually. In addition, individual teat cup pre-positioning (not illustrated), by means of which a plurality of teat cups can then be positioned simultaneously, is also conceivable.

The milking cluster 5 is also provided with a position sensor 13 which is designed here as a three-dimensional optical sensor. The position sensor 13 is used to adjust the milking cluster 5 from the parking position into the working position according to FIG. 5 by means of the arm device 6 and a drive unit 9.

The milking cluster 5 can take up different positions in the working position. A positioning position serves, for example, to position the teat cups 5a in such a manner that said teat cups can in each case be suspended on a corresponding teat of an animal to be milked. During the milking operation, the arm device 6 supports the milking cluster 5 in such a manner that the weight of the milking cluster does not adversely affect the milking operation. After milking has ended, the teat cups 5a are released again from the udder of the milked animal.

The movement operations of the arm device 6 and of the milking cluster 5 are controlled by means of a control device, which is not shown here. The control device is connected to the position sensor 13 and to the drive unit 9. In this exemplary embodiment, the drive unit 9 is mounted on an upper end of an upper arm drive shaft 12 which has a vertical axis z1. The upper arm drive shaft 12 and, with the latter, the drive unit 9 and the arm device 6 with the milking cluster 5 are fastened on the horizontal bar 4c of the space divider 4 in a guide unit 18 and are guided in a rotatory manner and also in a vertically adjustable manner. The upper arm drive shaft 12 is fixedly connected by the lower end thereof to an end of the upper arm 10 of the arm device 6. The upper arm shaft 12 is coupled at the upper end thereof to a drive of the drive unit 9. A further shaft for driving the lower arm 11, which shaft is drivable by a further drive of the drive unit 9, is arranged in the upper arm shaft 12, which is designed as a hollow shaft. The upper arm drive shaft 12 and the arm device 6, which is connected to the latter and has the milking cluster 5, are vertically adjustable by a vertical drive 15 (see FIG. 6), for example a pneumatic cylinder. The vertical drive 15 is connected at a lower end to the space divider 4 and is coupled at an upper end via a coupling means 16 in the region of the upper end of the upper arm shaft 12 to a holder (not described specifically) of the drive unit 9.

The drives of the drive unit 9 can be realized in a different way, such as, for example, as servomotors with corresponding gearings, but also direct drive motors are possible. In addition, said drives are designed, for example, as what are referred to as torque motors, as a result of which a certain elasticity of the arm device 6 and of the milking cluster 5 is achieved. It is possible, for example, to cushion kicking by the animal to be milked.

Both the upper arm 10 and the lower arm 11 are thereby drivable in a specific manner independently of each other. The upper arm 10 and the lower arm 11 are pivotable relative to each other about a vertical axis z2. In addition, the lower arm 11 is connected pivotably here to the milking cluster 5 via a joint with a vertical axis z3. The vertical axes z1, z2 and z3 are arranged parallel to one another.

In one embodiment, the lower arm 11 and also the milking cluster 5 (in one embodiment, the lower arm 11 can also be at the same time the milking cluster carrier, which is explained in more detail below) can be pivotable without a dedicated drive by means of parallel guides 37 by the pivoting movement of the upper arm 10. For this purpose, for example, only one pivoting drive 14 of the drive unit 9 is required (see FIG. 6).

The drive unit 9 here is arranged in the upper region of the space divider 4 above an animal to be milked and outside the reach thereof. This firstly has the advantage that the drive unit 9 does not lie in the region at risk from kicking. In addition, the upper region above the animal is better protected from moisture and the damage associated therewith. Furthermore, the particularly narrow structural form of the space divider 4 is therefore also possible. The arm device 6 with the milking cluster 5 is arranged in the lower region of the space divider 4 in such a manner that a required pivoting of the arm device 6 with the milking cluster 5 can take place from the side below the belly of an animal to be milked. In this case, the legs of the animal to be milked cannot be affected either.

In the parking position of the milking cluster 5 and of the arm device 6 within the cladding 4d of the space divider 4, the milking cluster 5 can be moved under a cleaning device 17 which is described in more detail below.

Figure 7:
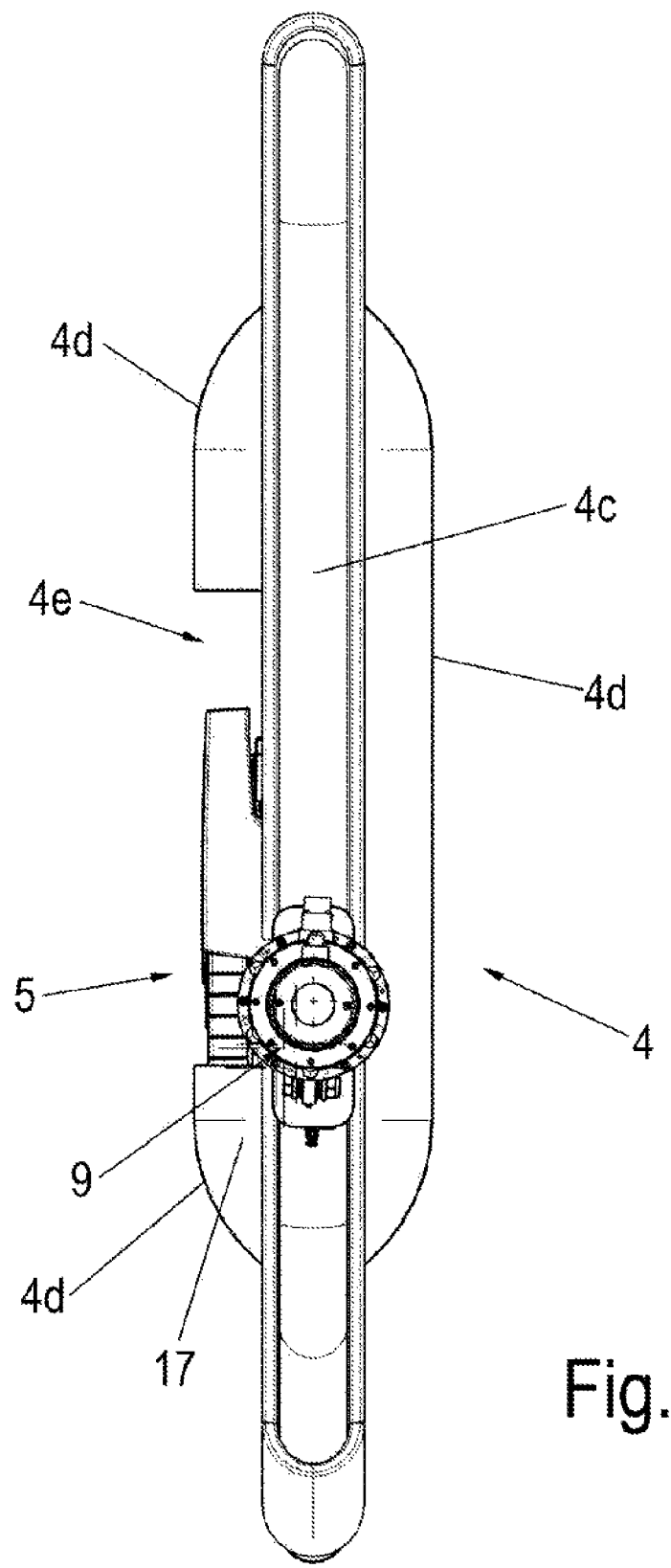
FIGS. 7 and 8 show a top view and bottom view of the space divider according to the invention with the arm device in the parking position.
Figure 8:
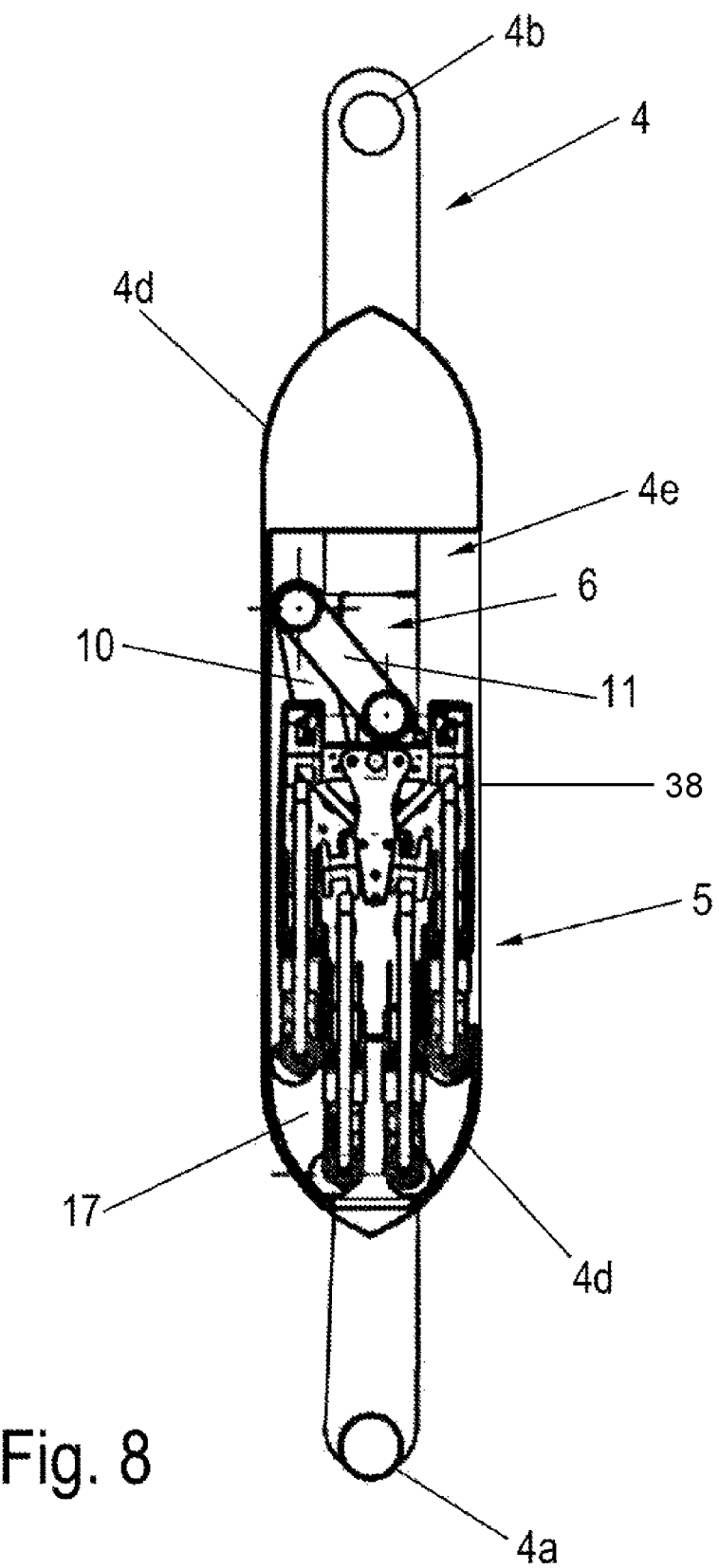

The space divider 4 according to the invention with the arm device 6 in the parking position is illustrated in a top view in FIG. 7. It can clearly be seen that the cladding bulges on both sides of a center longitudinal axis of the space divider 4 and completely accommodates the arm device 6 with the milking cluster 5 and is covered by a protective covering 38. FIG. 8 shows a bottom view in this respect.

Figure 9:
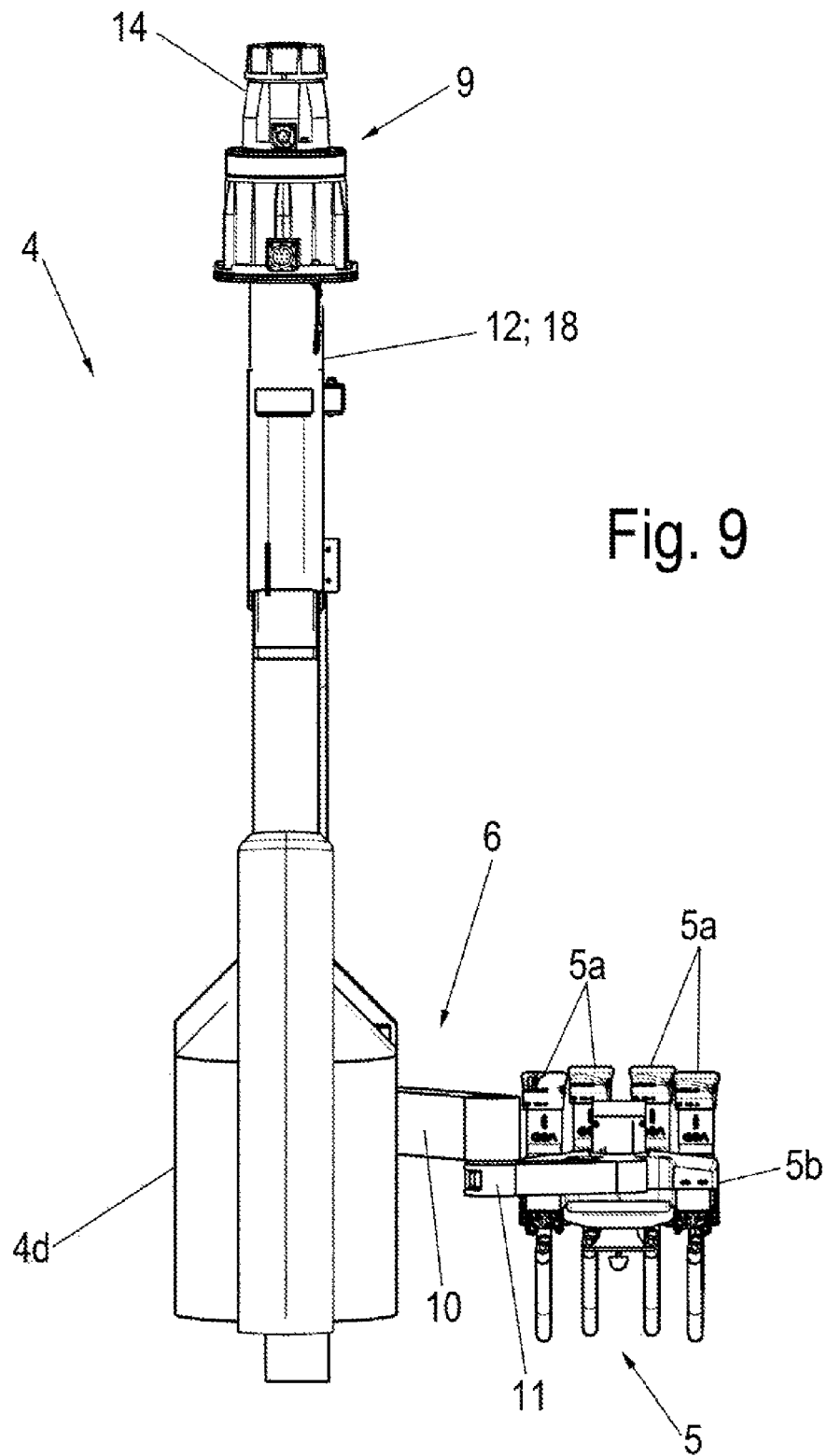
FIGS. 9-11 show a rear view, top view and bottom view of the space divider according to the invention with the arm device in a working position.

FIG. 9 shows the space divider 4 according to the invention in a rear view with the milking cluster 5 in the working position. The cladding 4d of the space divider 4 bulges in the lower region, i.e. below a belly of an animal which is to be milked and which stands to the side thereof, and therefore minimum construction space is taken up. This enables the animals T to stand precisely next to one another as closely as if there were no space divider 4 with integrated arm device 6 and milking cluster 5. The drive unit 9 is shown here with a motor of the pivoting drive 14. The milking cluster 5 has a milking cluster carrier 5b which is coupled pivotably to the lower arm 11 at the above-mentioned joint with the vertical axis z3.

Figure 10:
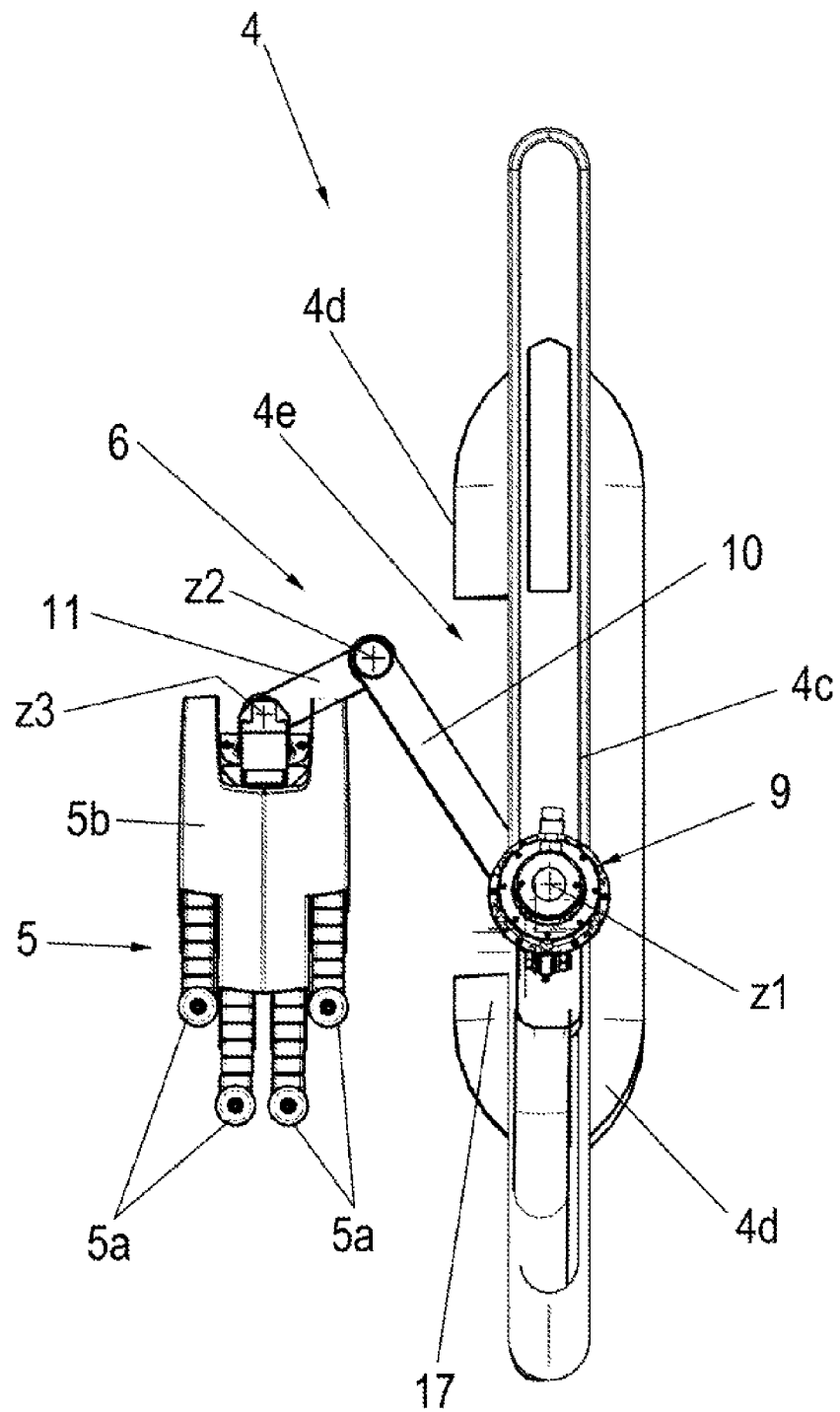

FIG. 10 illustrates a top view of the space divider 4 with the arm device 6 and the milking cluster 5 in the working position. The milking cluster 5 runs approximately parallel to the space divider 4.

Figure 11:
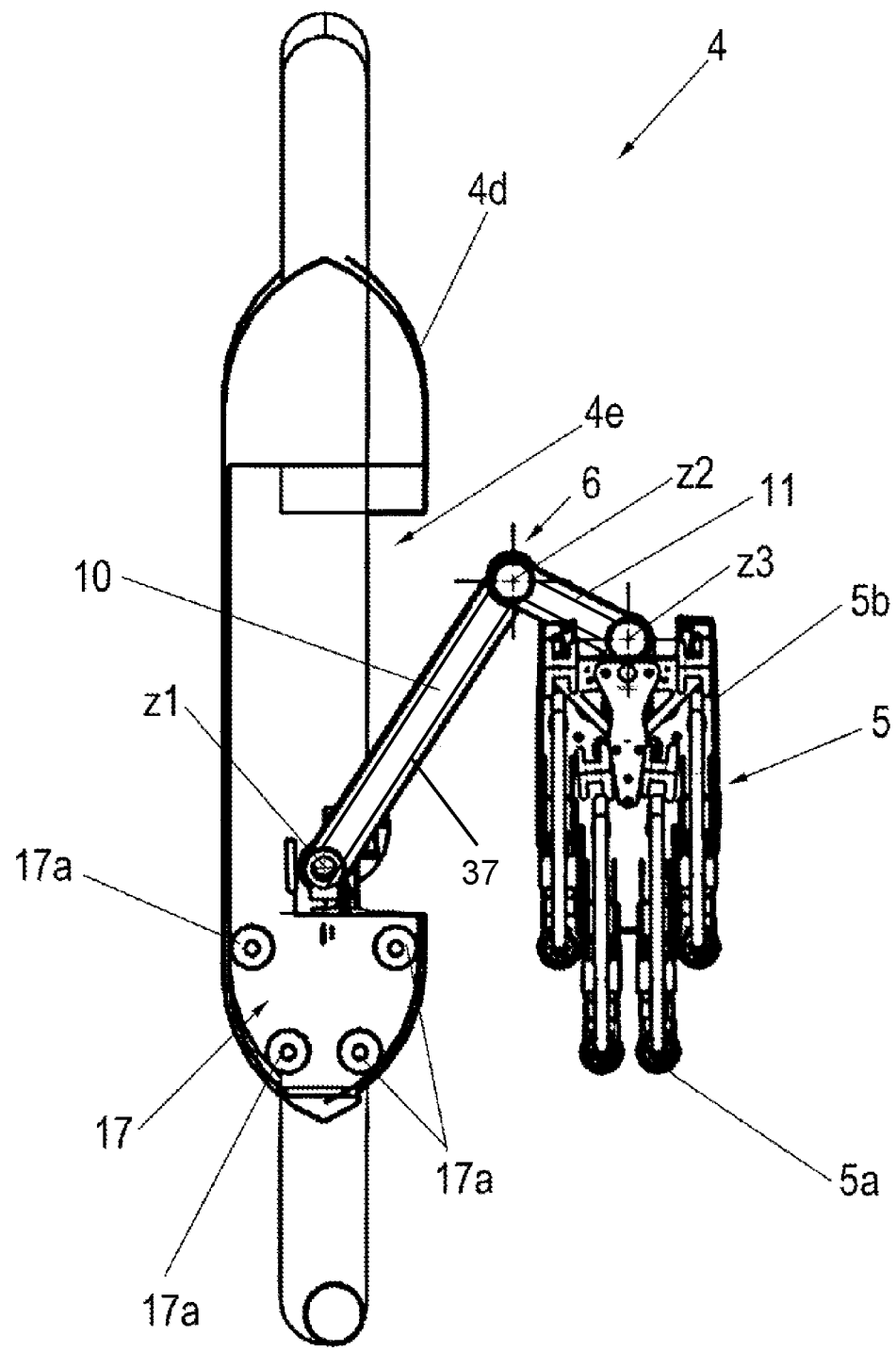

FIG. 11 illustrates the cleaning device 17 with cleaning nozzles 17a in a bottom view of the space divider 4. When the milking cluster 5 takes up the parking position, this position is at the same time a what is referred to as clean(ing)-in-place (CIP) position. In this case, the vertical drive 15 moves the arm device 6 with the milking cluster 5 upward in the vertical direction z until the cleaning nozzles 17a in each case interact with a teat cup 5a of the milking cluster 5 in order to clean said teat cups with a cleaning liquid. The cleaning nozzles 17a can also be charged with air in order to dry the teat cups after cleaning. It is also possible for the vertical drive 15 to move the milking cluster 5, and therefore the teat cups 5a, up and down in the vertical direction z by a certain distance, with the cleaning nozzles 17a being able to clean, for example, inside the teat cups 5a. The cleaning nozzles 17a can be designed in a corresponding manner for this purpose, for example as cone jet spray nozzles and/or radial jet nozzles. In addition to the cleaning nozzles 17a, in a special refinement, external cleaning nozzles (not illustrated here) can also clean the teat cups 5a on the outside. In addition, disinfection can also take place.

Figure 12:
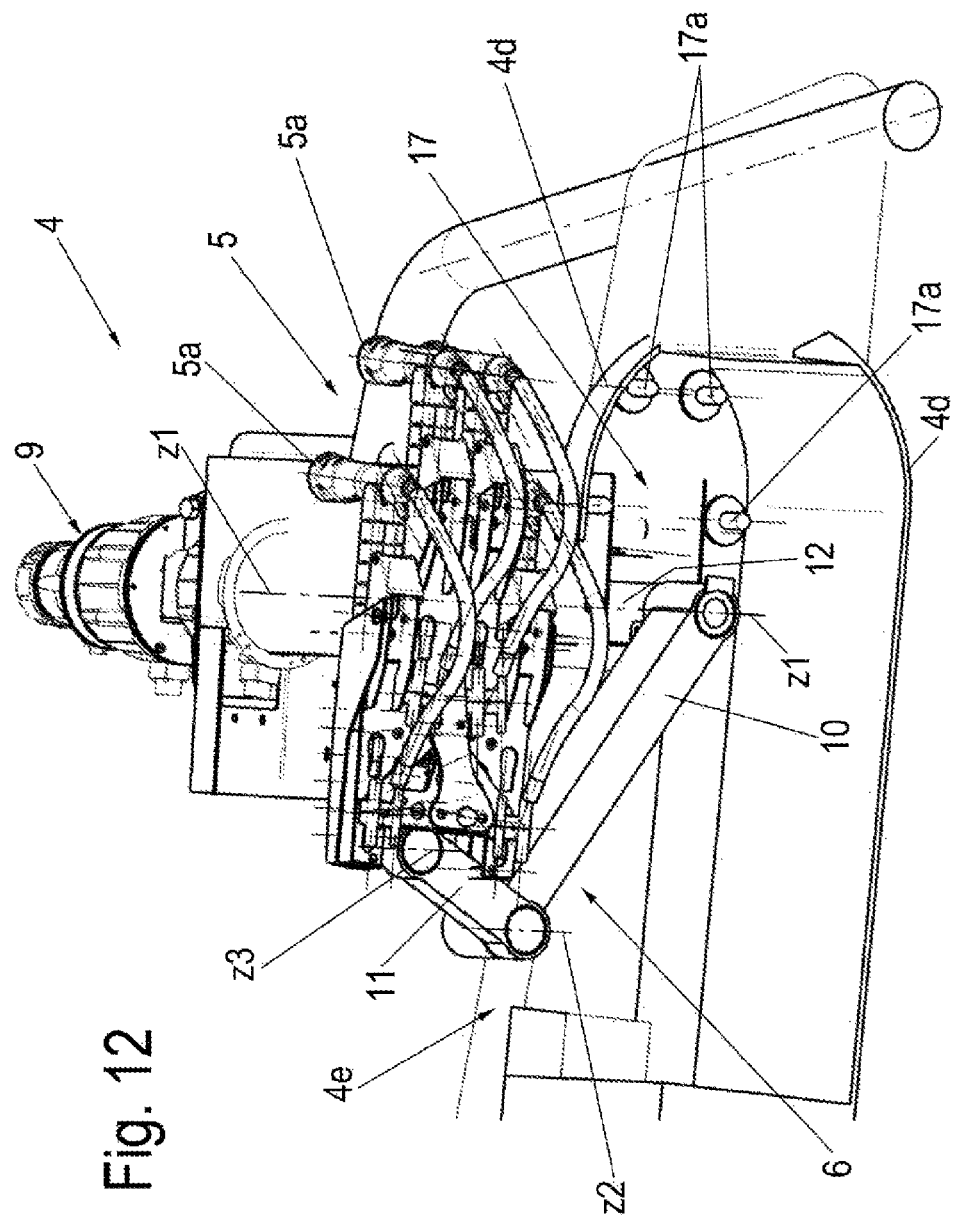
FIG. 12 shows a perspective partial view of the space divider according to the invention with the arm device in the working position, as seen from below.

FIG. 12 illustrates a perspective partial view of the space divider 4 according to the invention with the arm device 6 in the working position, as seen from below, wherein the cleaning device 17 with the cleaning nozzles 17a under the cladding 4d can readily be seen.

A start of milking is initiated by the control device having determined that the animal to be milked is in the milking position. This can be determined, for example, by camera or foot sensors, proximity sensors and the like. The milking begins with the positioning operation in the working position of the milking cluster 5. A rough positioning vertically can take place by means of a pneumatic cylinder as the vertical drive 20. A relative positioning of the teat cups onto the teats of the udder of the animal to be milked then takes place, with a positioning being undertaken with the position sensor 13 by the arm device 6 undertaking precise positioning of the milking cluster 5.

Figure 13A:
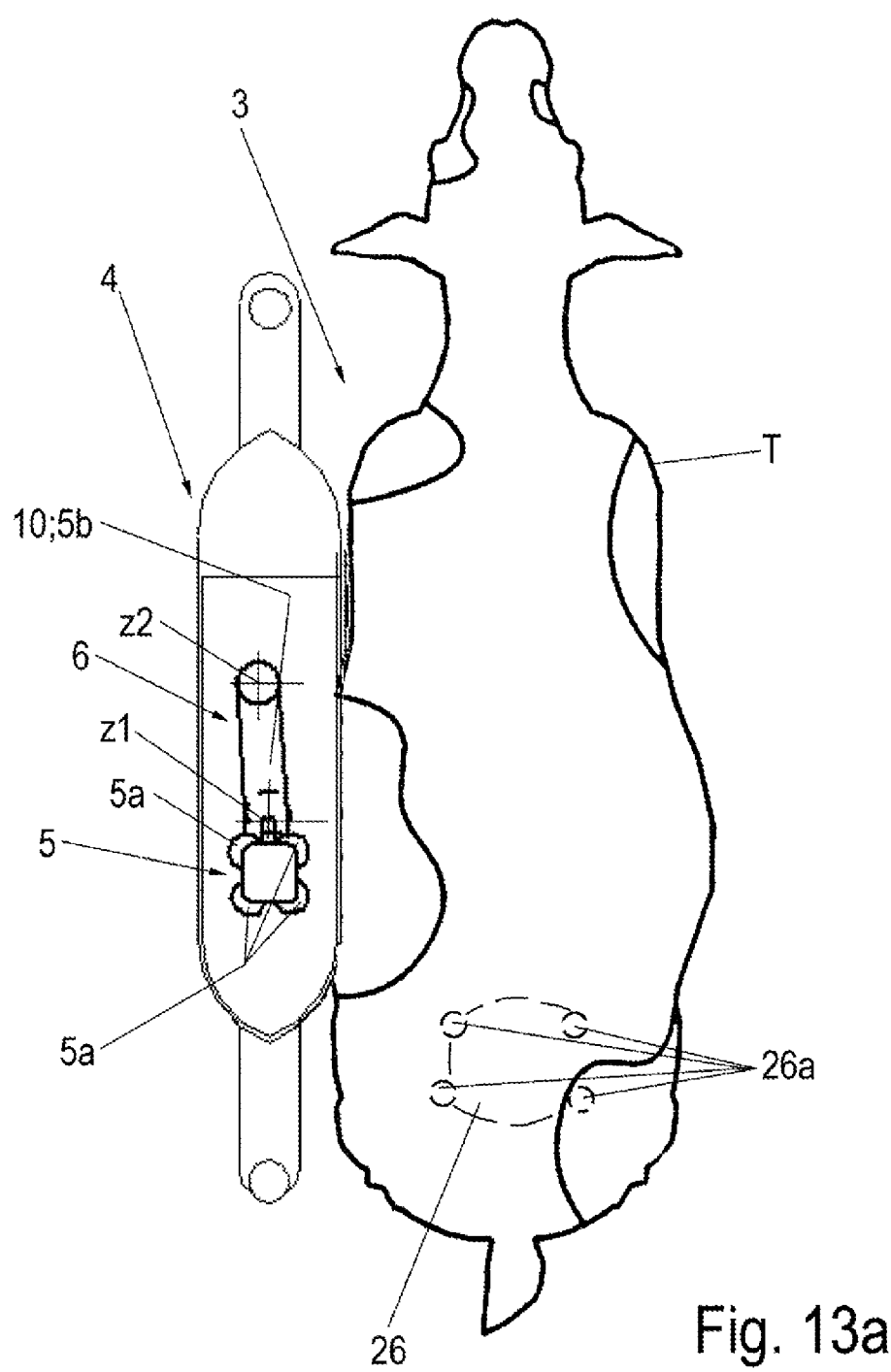
Figure 13B:
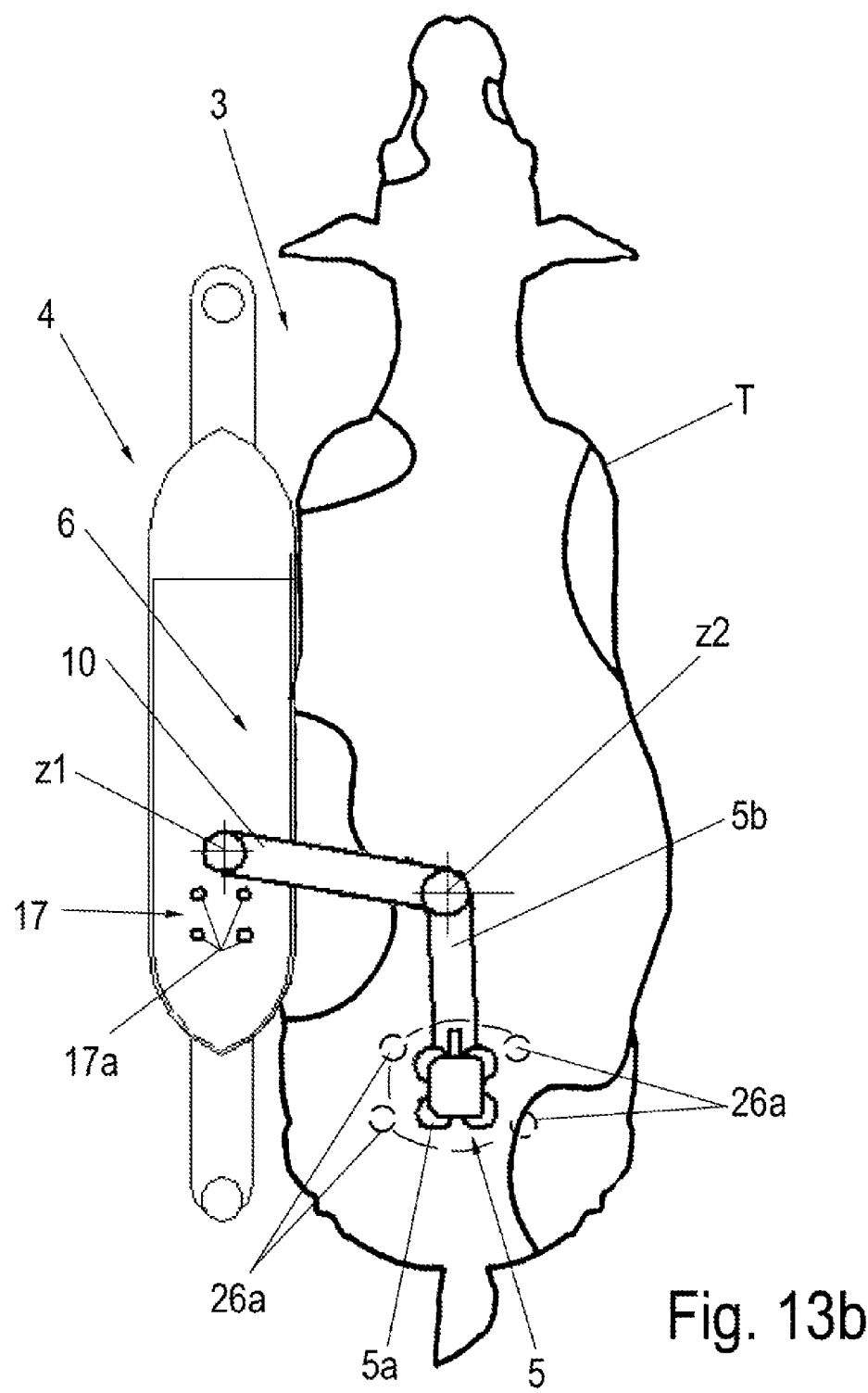

FIG. 13a illustrates the space divider 4 according to the invention with a variation of the arm device 6 in the parking position, in a bottom view with an animal T to be milked. FIG. 13b shows a preliminary position of the variation of the arm device according to FIG. 13a in the working position. FIG. 13c shows a milking position of the variation of the arm device according to FIG. 13a in the working position. FIG. 14a shows a side view in this respect, FIG. 14b shows a top view and FIG. 14c illustrates a front view of the milking parlor 3 for this purpose.

The animal T stands with its side tightly against the space divider 4, with an imaginary longitudinal axis of the animal T running approximately parallel to the longitudinal axis of the space divider 4. The lower side of the animal T having an udder 26 with four teats 26a is illustrated here.

In this variation of the arm device 6, the lower arm is designed as a milking cluster carrier 5b and the joint with the vertical axis z3 is not present. The upper arm 10 is connected to the one end of the milking cluster carrier 5b in an articulated manner about the vertical axis z2. The milking cluster 5, which is described in more detail below, is fastened to the other end of the milking cluster carrier 5b.

In FIG. 13a, the arm device 6 is in the parking position and at the same time in a rinsing position, wherein the milking cluster 5 is in contact with the cleaning device 17 (as described above) below the latter. The cleaning device 17 together with the cleaning nozzles 17a thereof is shown in FIGS. 13b and 13c.

A start of milking can be initiated by the control device having determined that the animal T to be milked is in the milking position. The milking with this arm device 6 then begins such that the arm device 6 moves the milking cluster 5 into the working position (shown in FIG. 13*b*) below the udder 26 of the animal to be milked. For this purpose, the milking cluster 5 is removed from the cleaning device 17, by adjustment of the arm device 6 in the direction of the vertical axis z1, such that said milking cluster can pivot under the animal T to be milked.

In the working position according to FIG. 13*b*, the arm device 6 with the milking cluster 5 takes up a preliminary position, which is also referred to as the gripping position. A milker M (see FIGS. 17-19) or a robot device 20 (an example in the form of an internal robot, see FIG. 20) thereupon grasps the teat cups 5*a* of the milking cluster 5 together (but this may also take place successively or else in pairs) and positions said teat cups onto the teats 26*a* of the udder 26 of the animal T to be milked. In other words, the lower arm of the arm device 6 is designed as a milking cluster carrier 5*b* for the milking cluster 5. The milking cluster carrier 5*b* with the milking cluster 5 is preliminarily positioned by the arm device 6, in the form of a milking cup module which can be pivoted into the working position under the center of the udder 26, into a position favorable for gripping by the milker M or by a robot device 20. The milker M stands behind or to the side of the animal T to be milked and carries out the positioning operation and, after milking has been carried out, carries out the operation to remove the teat cups 5*a* of the milking cluster 5. Instead of by the milker M, this can take place by the robot device 20 from various positions (from the rear, from the front through the legs of the animal T or from the side), as is also described in conjunction with FIG. 20.

Simple drives, such as, for example, compressed air cylinders, can be used here as the pivoting drive 14 and vertical drive 15. Of course, combinations with the motors referred to above are also possible.

In this embodiment, positioning with the position sensor 13 is not required. The position sensor 13 can either carry out rough positioning under the udder 26 below the animal T or can be entirely omitted. This is what is referred to as semi-automatic operation.

The milking cluster 5 used here is a conventional milking cluster 5 which is shown in FIG. 15*a* with the variation of the arm device 6 according to FIG. 13*a* in the preliminary position or gripping position according to FIG. 13*b*. FIG. 15*b* illustrates the milking cluster 5 in the milking position, as indicated in FIG. 13*c*, with the animal T to be milked not being shown here. FIG. 15*c* shows the milking cluster according to FIGS. 15*a*-15*b* in a variation in the preliminary position and FIG. 15*d* illustrates the milking position in this respect. FIG. 15*e* shows a partial sectional view of the milking clusters according to FIGS. 15*a* and 15*c* in the preliminary position, and the milking position in this respect is shown in FIG. 15*f*. FIG. 15*g* shows an enlarged sectional view along line XV in FIG. 15*f*.

The milking cluster 5 here has four teat cups 5*a* which are also referred to as milking cups. The functions of teat cleaning, pre-dipping and post-dipping are integrated in the milking cluster 5.

In the example illustrated, the milking cluster carrier 5*b* is designed as a square rectangular tube, wherein the end with the joint and the vertical axis z2 as a means of coupling to the upper arm 10 of the arm device 6 is not shown. The other end of the milking cluster carrier 5*b* is connected to a collecting piece 27 which is preferably designed as a milk collecting piece according to DE 10 2008 063 715 A1 (since a milking vacuum here is released only when the teat cups are positioned onto the teats 26*a*). The description of the function of such a milk collecting piece can be gathered from DE 10 2008 063 715 A1.

The connection between the milking cluster carrier 5*b* and the collecting piece 27 is shown as a fixed connection in FIGS. 15*a*-15*b*. In the variation according to FIGS. 15*c* and 15*d*, the collecting piece 27 is connected to the milking cluster carrier 5*b* via a connection which, in the preliminary position, forms a fixed connection and, in the milking position, permits freedom of movement of the collecting piece 27 within certain limits. This is explained in more detail below in conjunction with FIGS. 15*c*-15*d*.

Each of the four teat cups 5*a* is connected by the lower side thereof in a connecting section 5*a*-28 via an end piece 28*a* to a hose unit 28 which, for its part, is connected by a further, different end piece 28*b* to the collecting piece 27. Furthermore, each teat cup 5*a* is fastened on the lower side thereof, next to each end piece 28*a* of the respective hose unit 28, by one end of a traction mechanism 31, which is guided through a rigid segment element 29 (also referred to as center element), in a connecting section 5*a*-29. The traction mechanisms 31 can be, for example, cables, chains. Each segment element 29 here is of rectilinear design and has a crescent-shaped or banana-like cross section (see FIG. 15*g*), the center of which is provided with a passage 29*c* having a circular cross section for the traction mechanism 31. As shown in FIG. 15*g*, each hose unit 28 is surrounded, at least at the end pieces 28*a*-28*b*, approximately in a quarter circle by the associated segment element 29. Each segment element 29 has an end section 29*a* pointing toward the respective teat cup 5*a* and an end section 29*b* pointing toward the collecting piece 27, and is arranged between the lower side of the respective associated teat cup 5*a* and the upper side of the collecting piece 27.

The end section 29*a* of a respective segment element 29 is in contact with the connecting section 5*a*-29 of the respective teat cup 5*a* in the preliminary position by means of the tensile force of the traction mechanism 31 in such a manner that an external cone 29*e* of the end section 29*a* is in contact with an internal cone K' of the connecting section 5*a*-29, with centering being brought about (FIGS. 15*e*-15*f*).

In the preliminary position, the end section 29*b* of a respective segment element 29 is in contact, on the upper side of the collecting piece 27, with a centering section 27*e* with a passage opening next to the end piece 28*b* of the associated hose unit 28 by means of the tensile force of the traction mechanism 31. The centering section 27*e* has an external cone K which corresponds to, and interacts with, an internal cone of the end section 29*b* of the segment element 29 (FIGS. 15*e*-15*f*).

The respective traction mechanism 31, which emerges from the lower end of the segment element 29, is guided through the passage opening in the centering section 27*e* and then extends below the upper side of the collecting piece 27 into the milking cluster carrier 5*b* through the connection thereto. Furthermore, the traction mechanism 31 is coupled with the end thereof and with the ends of the other traction mechanisms 31 together to one end of an actuating bar 30*a* of an actuating device 30, for example a double-acting or rearwardly acting compressed air cylinder. The actuating device 30 is arranged within the milking cluster carrier 5*b*, which can be seen by a partially broken-open illustration of the milking cluster carrier 5*b*.

Not only in the parking position, but also in the preliminary position or gripping position in FIGS. 15*a*, 15*c*, 15*e*, the teat cups 5*a* are held tightly next to one another upright above the collecting piece 27 at a distance from the latter, wherein the distance is determined by the length of the segment elements 29. Also in this upright gripping position, all of the teat cups 5a are held as close as possible to one another so that, for example, the milker M can grasp all four teat cups 5a with two hands. This upright position is achieved by the tensile force of the traction mechanisms 31 by the actuating device 30 having tensioned the traction mechanisms 31, as a result of which the teat cups 5a are pulled against the segment elements 29 and against the upper side of the collecting piece 27 and secured until they are grasped by the milker M or by a robot gripper. As soon as the teat cups 5a are grasped, the actuating device 30 is released from the tensioning position thereof (FIGS. 15a, 15c, 15e) by being adjusted into a release position according to FIGS. 15b, 15d, 15f. This can take place by the milker M actively carrying out an operation, for example on a teat cup 5a or on the milking cluster carrier 5b (a foot switch may also be possible). In the case of the robot device 20, this can take place automatically by means of a control device.

In the release position or milking position (FIGS. 15b, 15d, 15f), the actuating bar 30a (for example a piston rod of a compressed air cylinder) is adjusted toward the collecting piece 27 and the traction mechanism 31 are no longer tensioned. Each teat cup 5a can thus be moved freely within the scope of the released length of the traction mechanisms 31 and of the hose units 28 and can be positioned onto the respective teat 26a of the animal T to be milked. A particular advantage of this embodiment consists in that a maximum freedom of movement of the teat cups 5a in the release position can be achieved with a small stroke, for example 15 . . . 20 mm, of the actuating bar 30a of the actuating device 30.

In the variation according to FIGS. 15c-15d, the collecting piece 27 is provided, in the region of the connection to the milking cluster carrier 5b, with a neck 27a which corresponds to an interior space (not illustrated) of a collar 5d of a supporting end 5c of the milking cluster carrier 5b and forms a fixed, but releasable connection to said interior space in the preliminary position or in the tensioned state of the traction mechanisms 31. The traction mechanisms 31 here run from the collecting piece 27 through the neck 27a thereof, through the collar 5d and the supporting end 5c of the milking cluster carrier 5b as far as the coupling point to the actuating bar 30a of the actuating device 30. In an end region of the neck 27a, which is surrounded by the collar 5d and partially by the supporting end 5c, the neck 27a is provided with one or more guide elements 27b which project outward and extend outward through the wall of the supporting end 5c and partially through the wall of the collar 5d, by means of a guide recess 5e. The guide element 27b illustrated in FIG. 15d is only by way of example and is designed here as a pin which is guided in the recess 5e, which is formed as an elongated hole in the wall of the supporting end 5c and of the collar 5d. This design is also carried out on the opposite side, this not being shown but being easily conceivable.

The recess 5e which is in the form of an elongated hole extends here in the longitudinal direction of the milking carrier 5b, and guides the guide element 27b to a limited extent through the elongated hole.

In the tensioned position of the traction mechanisms 31 that is shown in FIG. 15c and which is also at the same time the parking position or the preliminary position, the collecting piece 27 is retracted together with the neck 27a into the collar 5d and into the supporting end 5c of the milking cluster carrier 5b in order to form a fixed, but releasable connection. In the released position, i.e. in the milking position, the traction mechanisms 31 are loosened, as shown in FIG. 15d, wherein not only are the teat cups 5a released, as described above, and the collecting piece 27 can be pulled out of the supporting end 5c and the collar 5d and out of the milking cluster carrier 5b by a certain amount in the longitudinal direction thereof. This amount is limited, as described above, by the recess 5e. The collecting piece 27 can move within limits in directions of movement 27c and 27d, as indicated, for example, by the arrows in the upper part of FIG. 15d. This freedom of movement has, for example, the advantage that positioning of the teat cups 5a in the case of what are referred to as stepped udders of animals to be milked is facilitated.

FIG. 16a shows a schematic sectional view of a fourth exemplary embodiment of the milking parlor arrangement according to the invention of the space divider 4 according to the invention with a further variation of the arm device 6' in a parking position. A working position in the preliminary position or gripping position is illustrated in FIG. 16b.

The milking parlors 3 of this exemplary embodiment can be milking parlor arrangements 1 according to FIGS. 1-3 and 17-20. Of course, other arrangements are not excluded. The example of an external rotary milking parlor is shown here, wherein the milking parlors 3 are separated by the space dividers 4. A space divider 4 is not illustrated here, but is easily conceivable.

FIG. 16a shows just one milking parlor 3 of a milking platform 1b with a lower side 1a. The milking platform 1b belongs, for example, to the milking parlor arrangement 1 according to FIG. 1. The milking parlor 3 is shown here in the position in which said milking parlor is shown on the left side next to a bridge 1c. A pivot point 2, i.e. the center point, of the rotary milking parlor lies with the milking parlor 3 on the right side in FIGS. 16a and 16b. A rotation of the rotary milking parlor in the clockwise direction about said pivot point 2, which is not shown, but is easily conceivable (see FIG. 1), signifies a rotational movement into the plane of the drawing of FIGS. 16a and 16b, wherein the head side of the animal T points toward the pivot point 2, and the animal T rotates together with the milking parlor 3 to the left, as seen from the position of the animal T in FIG. 16b. The bridge 1c serves for the crossing by one animal T to be milked, in order to enter the milking parlor 3, or for the crossing by a plurality of animals. A slot 1d of a width which is not of a size sufficient in order to trap the hooves of the animals T therein is provided between the bridge 1c and the milking platform 1b. In addition, the milking parlor 3 is provided with an excrement channel 35 (not described specifically). In the parking position shown in FIG. 16a, the animals T, on entering the milking parlors 3 from the bridge 1c, are in no way disturbed by the arm device 6', since the latter is folded under the edge of the bridge 1c and the edge of the milking platform 1b and is therefore invisible to the animals T and does not adversely affect the movements thereof.

The arm device 6' is arranged on the outer edge of the milking platform 1b, on the lower side 1a thereof below the slot 1d and below an end region of the bridge 1c. The arm device 6' has a retaining arm 33 which is mounted at an upper end in the lower region of the slot 1d at a joint with a horizontal axis 34, which runs tangentially to the milking platform 1b, which is circular here, so as to be pivotable about said horizontal axis 34. This joint with the horizontal axis can be arranged on, or fastened to, the milking platform 1b or a section of the space divider 4. The retaining arm 33 is fixedly connected at the lower end thereof to the milking cluster carrier 5b in such a manner that the milking cluster carrier 5b is arranged at right angles to the retaining arm 33 and the milking cluster 5, which is attached to the milking cluster carrier 5b and has the teat cups 5a, points downward in this parking position. The retaining arm 33 is used here as a milking-cluster presenting holder and as a hose holder.

The milking cluster 5 is designed, for example, in the manner as illustrated in FIGS. 15a-15e, wherein the milking cluster carrier 5b has a corresponding length. The actuating device 30 can be arranged, for example, on or in the retaining arm 33. In the parking position shown in FIG. 16a, the teat cups 5a of the milking cluster 5 are pressed against one another in the tensioned position. In addition, they are in contact here upside-down with the cleaning nozzles 17a of the cleaning device 17 (see FIG. 13b) which is fastened on a retaining plate 32a to the lower side 1a of the milking platform 1b via a vertical holder 32. The vertical holder 32 may also be attached to a section of the space divider 4.

As soon as an animal T which is to be milked is in the milking parlor 3 and the milking platform 1b has moved away from the bridge 1c, the arm device 6' is brought into the preliminary position from the parking position into the working position, as illustrated in FIG. 16b. For this purpose, the retaining arm 33 with the milking cluster carrier 5b located thereon and with the milking cluster 5 is pivoted by 180° about the horizontal axis 34 and rests with the end thereof, to which the milking cluster carrier 5b is attached, on the upper side of the milking platform 1b by means of a resting section (not denoted specifically) in the form of a stop. The gripping position is thereby reached, and the milker M or a robot device 20 can carry out the operation to position the teat cups 5a.

The drive of the retaining arm 33 is not shown here, but it is easily conceivable that the drive is located in the space divider 4 and pivots the retaining arm 33, for example, via a shaft with a gearing. A removal operation after milking is not described in more detail here and it can be understood that this proceeds in the reverse sequence.

The retaining arm 33 is arranged centrally with respect to the milking parlor 3, i.e. at the edge of the milking platform 1b centrally between two space dividers 4 of the milking parlor 3.

It is conceivable for the space divider 4 to be extended downward and to receive the cleaning device 17 and the arm device 6' in the parking position. The retaining arm 33 here can first of all be moved, for example pivoted, from the parking position in the lower region of the space divider 4 into an intermediate position in the central position between the space dividers 4, and can be pivoted through 180° about the horizontal axis 34 into the gripping position.

Figure 17:
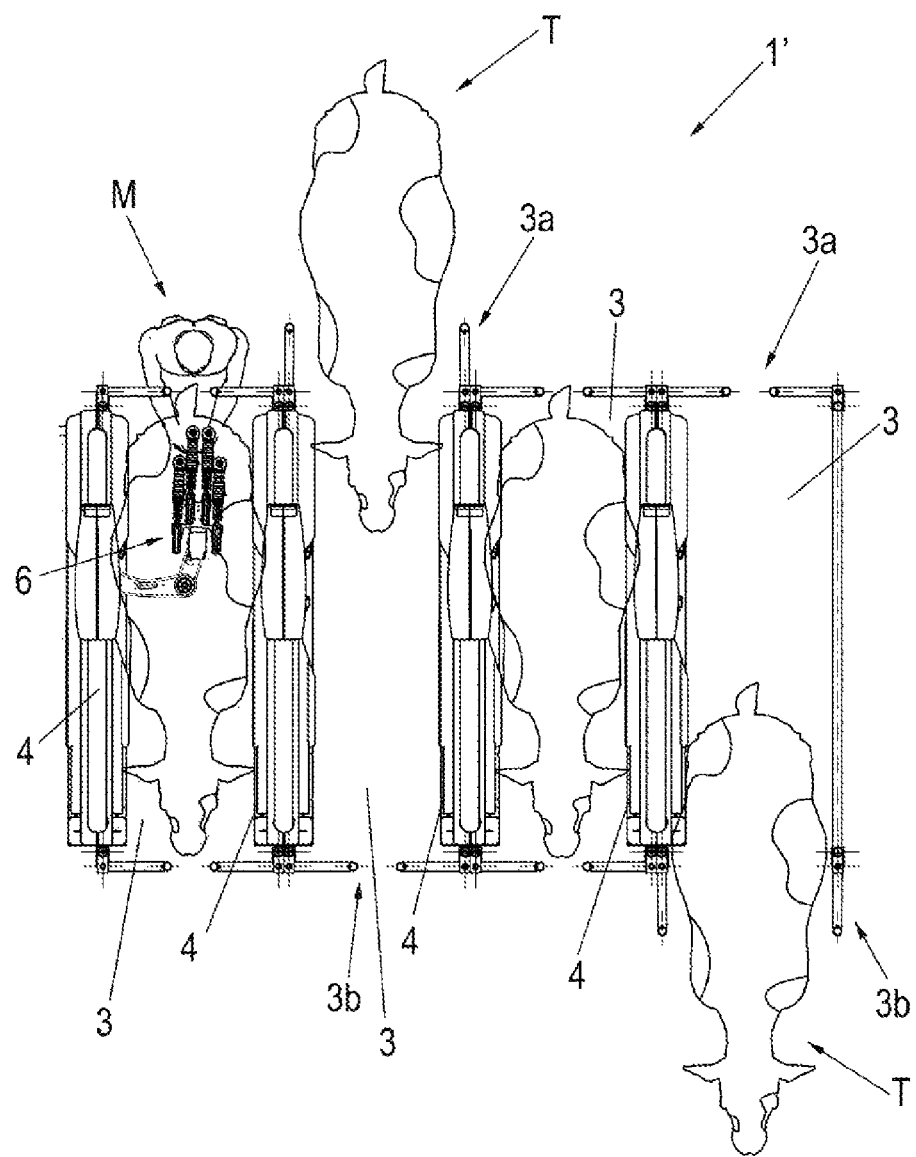

FIG. 17 shows a schematic top view of a variant of the second exemplary embodiment according to FIGS. 2-2a. This variant is also referred to as drive-through milking parlor arrangement 1'. The milking parlors 3 are separated laterally by the space dividers 4. Gates 3a, 3b are arranged in each case on the narrow rear sides and front sides of the milking parlors 3, wherein the gates 3a on the rear sides are open in order to form an inlet for an animal T into the milking parlor 3 (second milking parlor 3 from the left in FIG. 17). The animal T cannot escape at the front side, since the latter are closed by the gates 3b. If an animal T is located completely in the milking parlor 3, the gates 3a of the rear side are closed (first and third milking parlor 3 from the left in FIG. 28). If the milking operation is completed, the gates 3b of the front side open, and the animals T can leave the milking parlor 3 again, as is illustrated in the case of the fourth milking parlor 3 from the left in FIG. 18.

Figure 18:
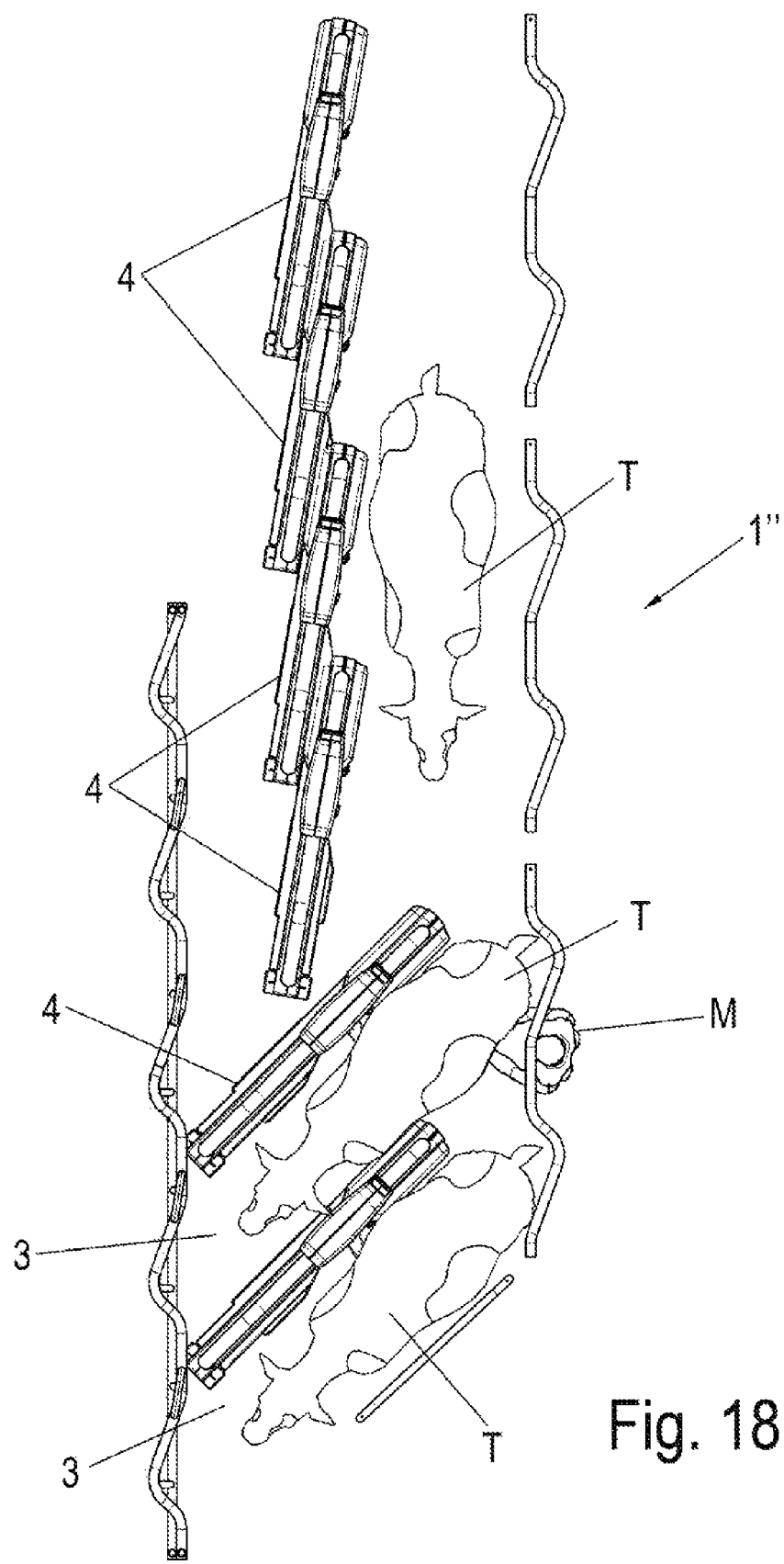
FIG. 18 shows a schematic top view of a variant of the third exemplary embodiment according to FIG. 3.

Of course, a type of herringbone construction is also possible, with the milking parlors 3 being separated by the space dividers 4. FIG. 18 shows this in a schematic top view of a variant of the third exemplary embodiment according to FIG. 3. In FIG. 3, the milking parlors 3 are formed by the space dividers 4 which have previously been folded against one another in such a manner that a passage is formed as an entry, wherein the space dividers 4 which are folded against one another form a continuous limitation of said entry. When the first animal T reaches that end of the milking parlor arrangement which is formed by a limitation (not denoted specifically) which is at right angles, in FIG. 3, and at an angle of, for example, 45° with respect to the longitudinal axis of the entry in FIG. 18, the first space divider 4 is rotated in the clockwise direction until said space divider runs parallel to said limitation and forms the first milking parlor 3 therewith. All of the milking parlors are thereby formed successively by the corresponding pivoting of the space dividers 4. By means of the oblique position of the animals T, i.e. the imaginary longitudinal axes thereof run at an angle to the longitudinal axis of the entry, the rear regions of the animals T are free for access from the side by a milker M. This is in each case the left side of an animal T in FIG. 18.

It is also possible in the case of the milking parlor arrangements 1' according to FIGS. 3 and 18 for the space dividers 4 not to be folded against one another, but rather to be arranged so as to be displaceable in the longitudinal axes thereof. This is not shown, but is easily conceivable if only the milking parlors 3 which are already formed are considered. The space dividers 4 have previously already been erected outside the region of the animals T in the parallel arrangement to the limitation (at right angles or obliquely). As soon as the first animal T has been lined with the imaginary longitudinal axis thereof next to the limitation, the first space divider 4 is pushed in the direction of the longitudinal axis thereof into the region of the animals T in such a manner that said space divider is located on the other side of the animal T and forms the milking parlor 3. When the milking parlors 3 formed in such a manner are left, the limitation is opened (pivoted or else displaced in the direction of the longitudinal axis thereof, and the first animal T can leave the milking parlor 3. The first space divider 4 is then pushed back again in the direction of the longitudinal axis thereof into the starting position thereof, etc.

Figure 19:
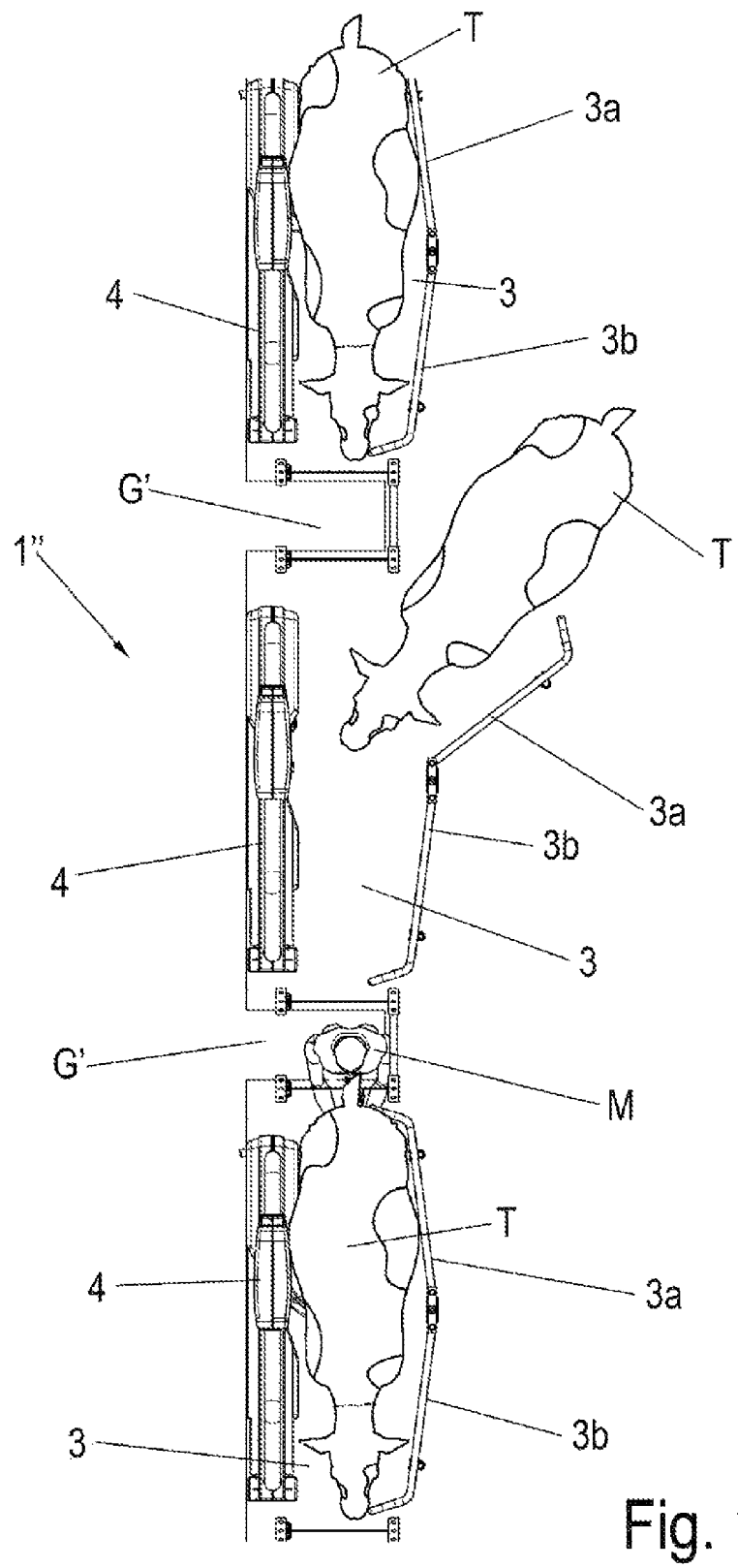
FIG. 19 shows a schematic top view of a further variant of the third exemplary embodiment according to FIG. 3.

FIG. 19 illustrates a schematic top view of a further variant of the third exemplary embodiment according to FIG. 3. This milking parlor arrangement 1'' is also referred to as a tandem arrangement. The milking parlors 3 here are arranged one behind another or in a row, wherein the narrow sides thereof are spaced apart by the pit G' for the milker M and each have limitations, for example grills. The longitudinal sides of the milking parlors 3 are firstly formed in each case by a space divider 4 and by a two-part limitation, in the form of gates 3a, 3b. The gate 3a of the central milking parlor 3 is pivoted open in order to allow an animal T into the milking parlor 3, with the gate 3b being closed. During the milking operation, the two gates 3a, 3b are closed. After the milking, the gate 3b pointing toward the head of the animal T is opened, and the animal T can leave the milking parlor 3.

Figure 20:
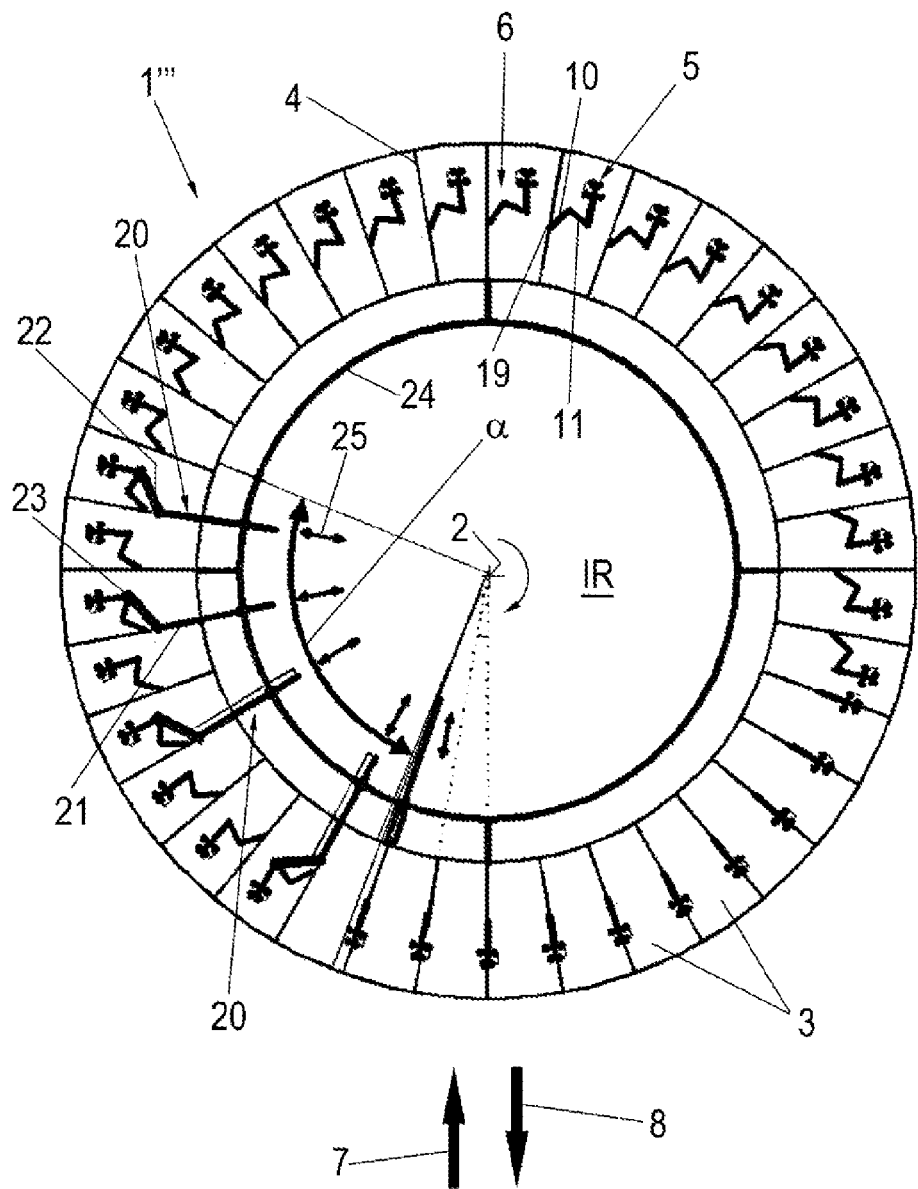
FIG. 20 shows a schematic top view of a variation of the first exemplary embodiment of the milking parlor arrangement according to the invention with a robot device.

Finally, FIG. 20 shows a schematic top view of a variation of the first exemplary embodiment of the milking parlor arrangement 1''' according to the invention with a robot device 20.

The milking parlor arrangement 1''' is an external rotary milking parlor, in a similar manner as described above in conjunction with FIG. 1. If the animal T has taken up the predefined position thereof in the milking parlor 3, the milking cluster 5 is adjusted within a circular section, which is referred to here as the positioning region a, from the parking position in the space divider 4 laterally with respect to the animal to be milked into the preliminary position, and into the working position, under the udder of the animal.

A positioning technique for adjusting the arm device 6 with the milking cluster 5 is provided in an interior space IR of the milking parlor arrangement 1''' in the form of a robot device 20 in the form of an internal robot. In this exemplary embodiment, the robot device 20 comprises five robot arms each having a radial section 21 and a gripping arm 22 with a gripping section 23, which are movable independently of one another on a rail 24. In this exemplary embodiment, the rail 24 is arranged above the milking parlors 3 outside the reach of the animals and in a manner protected against soiling. In the case of this milking parlor arrangement 1''', which is designed here as a rotary milking parlor with the pivot point 2, the rail 24 is likewise formed in a circular manner concentrically with the circular construction of the rotary milking parlor, with the pivot point 2 of the rotary milking parlor as the center point. In this manner, during a rotational movement of the milking parlor arrangement 1''', the robot arms are also movable synchronously with said rotary movement. The rotary movement of the milking parlor arrangement 1''' can be maintained without interruption.

That is to say, as soon as an animal has entered a milking parlor 3, and is settled and ready for milking, which is detectable, for example, via suitable animal sensor technology (for example, camera, movement sensor, acoustic sensor, etc.) and actuator technology (for example output/consumption of feed), the robot arm is moved from a starting position in the interior space IR, in which position said robot arm does not reach into the milking parlors 3, outward in the radial direction 25 between two milking parlors 3 in the region of the space divider 4 into the positioning position thereof, grasps the milking cluster 5, which is in the preliminary position or gripping position below the udder 26 (see FIG. 13b) of the animal and moves the released teat cups 5a in each case onto the teats 26a for positioning purposes (see FIG. 13c). A positioning by the position sensor 13, which is arranged, for example, at the gripping section 23, is made possible in the process. The arm device 6 holds the milking cluster 5, the teat cups of which are positioned on the teats of the udder 26. The robot arm only makes one movement here in the radial direction 25 directly toward the milking cluster 5.

As soon as the teat cups 5a of the milking cluster 5 are positioned, the robot arm is released by the gripping section 23 thereof from the arm device 6 and moves back in the radial direction 25 into the starting position thereof in the interior space IR. The arm device 6 carries the milking cluster 5, and therefore the weight thereof, with only the teat cups 5a, positioned on the teats of the udder, hanging with a weight which is small in comparison to a weight of the milking cluster 5 and the arm device 6 and includes the hoses. During this positioning operation, the rotary milking parlor continues to move continuously without any interruption of the movement thereof, in the clockwise direction here about the pivot point 2. A rotational movement also in the counterclockwise direction is, of course, also possible. The robot arm (or the other ones likewise) moves/move on the rail 24 synchronously with respect to the rotary milking parlor in the same direction of rotation and at the same angular speed during the positioning operation, preferably in the positioning region a. The rail 24 is arranged above the milking parlors 3 outside the reach of the animals and in a manner protected against soiling and is preferably fastened on the milking parlor arrangement 1, i.e. on the moving part thereof.

The arm device 6 has the upper arm 10 and the lower arm 11, or the lower arm designed as the milking cluster carrier 5b, and is guided and mounted at one end of the upper arm 10 in a bearing unit 19 or in the guide unit 18 within the space divider 4 so as to be pivotable about the vertical axis z1 (see FIG. 6) and so as to be adjustable vertically along the vertical axis z1 and, as described above, is movable by the pivoting drive 14 and the vertical drive 15. The arm device 6 has the function of carrying the milking cluster 5 so as to balance the weight and to be smooth-running such that it follows the movements of the animal to be milked. The arm device 6 can also be designed in the manner shown and described in FIGS. 13a-13c or in FIGS. 16a-16b. For the situation according to FIGS. 16a-16b, the gripping arm 22 of the robot device 20 is, of course, appropriately adapted, which is easily conceivable.

All of the milking parlors 3 on the outer circumference of the milking parlor arrangement 1''' are freely accessible from the exterior region by a milker M, and therefore the milker can intervene in a milking operation at any time. This working region is therefore kept free of additional devices, whereas the robot arms operate only in the interior space IR within a limited area. The milker M is thus not obstructed if he has to control, look after and intervene in a correcting manner in, the entire milking parlor arrangement 1'''. Even if a manual intervention of the milker M is necessary, for example if teat cups 5a of the milking cluster 5 have fallen off, the rotary milking parlor can continue to rotate.

After the milking operation is completed, the milking cluster 5 is automatically removed from the animal T being milked, or automatically drops again into the released position in the preliminary position and is finally pivoted again into the parking position, as described above. The rotary milking parlor also continues to move during this operation.

Of course, it is also possible for a differently designed robot device to undertake the positioning operation of the milking cluster 5 in the preliminary position, from the side, from the rear or from below with respect to the animal.

The invention is not restricted to the exemplary embodiments illustrated above, but rather can be modified within the scope of the appended claims.

It is thus conceivable, for example, that, in the case of the second exemplary embodiment of the milking parlor arrangement 1' according to the invention as per FIG. 2, a plurality of rows of milking parlors 3 arranged next to one another can be arranged one behind another or even also one above another on several floors.

The position sensor 13, in an extension or merely in the form of a camera, can also supply, for example, images regarding the state of the udder of the animal to be milked and can consequently contribute to the knowledge of the state of health of the animal to be milked.

Each milking parlor 3 can be activated or blocked per se. The milking parlor arrangement 1 can continue to be operated even when milking parlors 3 are blocked, for example it is not necessary to stop the rotary milking parlor.

Each milking parlor 3 can be prepared individually for an animal, for example different predefined preliminary positions of the milking cluster 5 with the arm device 6. In other words, in the case of the semi-automatic version, the preliminary position of the milking cluster 5 can be automatically adapted to the animal to be expected in the respective milking parlor 3 if a recognition device (for example RFID) recognizes the respective animal which enters the milking parlor 3. In addition, it can be possible, in the case of a recognized animal, for a preliminary positioning of the teat cups 5a to be able to be carried out in a manner adapted to the udder dimensions of the recognized animal.

In addition, each milking parlor 3 can have a feeding device.

The milking cluster can, of course, also be used for milk-producing animals with udders which have a different number of teats, for example 2, 3 or 4.

The milking parlor arrangement 1 as a rotary milking parlor can be designed in such a manner that even a plurality of 360° rotations can be realized for a milking operation of a certain animal if this is necessary. In this case, the animal is prevented from leaving the milking parlor 3 when the animal arrives at the exit 8.

The invention claimed is:

1. A space divider of a milking parlor arrangement for at least one milking parlor for milking milk-producing animals, wherein the space divider is arranged approximately parallel to a longitudinal axis of an animal space, the space divider comprising:
an arm device;
an actuator supported by the arm device;
a milking cluster supported by the arm device, and having:
a teat cup and;
a collecting piece disposed between the arm device and the teat cup, and;
the milking cluster is joined to the arm device for adjustment between a parking position arranged in the space divider, and a working position determined to be between front and hind legs of the animal to be milked;
a segment defining a traction mechanism guide, and the segment is disposed between and at least partially defines a distance between the teat cup and the collecting piece in the parking position; and
a connector disposed at least partially in the traction mechanism guide defined by the segment, the connector being fastened at one end to the teat cup and coupled at another end to the actuator.

2. The space divider of claim 1, wherein the arm device is further adjustable between the parking position, the working position, and a positioning position for automatically positioning the milking cluster in relation to a teat attaching position, and the milking cluster comprises:
at least one position sensor to gather data for adjusting the milking cluster into the positioning position.

3. The space divider of claim 1, wherein the arm device working position is a predetermined and fixed preliminary position.

4. The space divider of claim 1, wherein the teat cup of the milking cluster and the segment are upright and spaced apart above the collecting piece, in the parking position.

5. The space divider of claim 4, wherein:
the segment is substantially rigid and is disposed to define substantially all of the distance between the teat cup and the collecting piece in the parking position.

6. The space divider of claim 1, wherein the actuator tensions the connector in the parking position to hold the teat cup upright above the collecting piece at the distance from the collecting piece.

7. The space divider of claim 1, wherein the collecting piece is releasably joined to the arm device in the parking position and in a preliminary position, and the collecting piece is released from the arm device in the milking position.

8. The space divider of claim 7, wherein the collecting piece is movable within predetermined limits relative to the arm device when the collecting piece is released from the arm device in the milking position.

9. The space divider of claim 1, wherein the actuator comprises:
a pneumatic cylinder.

10. The space divider of claim 1, wherein the arm device comprises:
an upper arm; and
a lower arm pivotably joined to the upper arm.

11. The space divider of claim 10, wherein:
the collecting piece is joined to the lower arm.

12. The space divider of claim 1, and further comprising:
an arm device drive unit operatively joined to the arm device and the space divider.

13. The space divider of claim 1, and further comprising:
an arm device drive unit operatively joined to the arm device and arranged below a dairy animal milking platform of the milking parlor.

14. The space divider of claim 1, wherein the space divider defines an opening in a front half of the space divider in which the arm device and the milking cluster are arranged when in the parking position.

15. The space divider of claim 14, wherein the arm device with the milking cluster in the parking position, are disposed within a section of the space divider that is disposed below a dairy animal milking platform.

16. The space divider of claim 14, and further comprising:
a protective covering disposed at least partially over the opening in the space divider.

17. The space divider of claim 14, and further comprising:
a milking cluster cleaning device arranged in the space divider.

18. The space divider of claim 1, wherein the traction mechanism guide is a parallel guide.

19. The space divider of claim 1, wherein the space divider is preassembled with an arm device before installation in the milking parlor arrangement.

20. The space divider of claim 1, wherein:
the arm device includes a lower arm and an upper arm; and
the lower arm includes a teat cup support.

21. A space divider of a milking parlor arrangement for at least one milking parlor for milking milk-producing animals, wherein the space divider is arranged approximately parallel to a longitudinal axis of an animal space, the space divider comprising:
an arm device;
an actuator supported by the arm device;
a milking cluster supported by the arm device, and having:
a teat cup coupled to the actuator;
a collecting piece disposed between the arm device and the teat cup; and
the milking cluster is joined to the arm device for adjustment between a parking position arranged in the space divider, and a working position determined to be between front and hind legs of the animal to be milked; and
a segment disposed between and at least partially defining a distance between the teat cup and the collecting piece in the parking position.

* * * * *